(12) United States Patent
Inoue

(10) Patent No.: US 8,428,408 B2
(45) Date of Patent: Apr. 23, 2013

(54) OPTICAL PULSE RESHAPING DEVICE, OPTICAL PULSE LIGHT SOURCE, SUPER-CONTINUUM LIGHT GENERATOR AND METHOD FOR SUPER-CONTINUUM LIGHT GENERATION

(75) Inventor: Takashi Inoue, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 679 days.

(21) Appl. No.: 12/595,428

(22) PCT Filed: Mar. 28, 2008

(86) PCT No.: PCT/JP2008/056102
§ 371 (c)(1),
(2), (4) Date: Apr. 14, 2010

(87) PCT Pub. No.: WO2008/126703
PCT Pub. Date: Oct. 23, 2008

(65) Prior Publication Data
US 2010/0209060 A1    Aug. 19, 2010

(30) Foreign Application Priority Data
Apr. 11, 2007 (JP) ................................ 2007-104264

(51) Int. Cl.
*G02B 6/00* (2006.01)
(52) U.S. Cl.
USPC ................. 385/122; 385/27; 385/37; 398/81; 398/148
(58) Field of Classification Search .................... 385/27, 385/37, 122; 398/81, 148
See application file for complete search history.

(56) References Cited

U.S. PATENT DOCUMENTS 7,483,608 B2 * 1/2009 Inoue et al. ................... 385/122
2005/0169324 A1 8/2005 Ilday et al.

FOREIGN PATENT DOCUMENTS

| JP | 11-150510 A | 6/1999 |
| JP | 2006295195 A | 10/2006 |
| WO | 0186846 | 11/2001 |

OTHER PUBLICATIONS

Chinese Office Action (with translation) dated Aug. 3, 2012 for CN Application Serial No. 200880011539.X, 7 pages.
Translation of Chinese Office Action dated Jan. 5, 2012 for Chinese Application No. 200880011539.X, 4 pages.
Chinese Office Action dated Jan. 5, 2012 for Chinese Application No. 200880011539.X, 4 pages.
Translation of Office Action dated Sep. 30, 2010 for Chinese Application No. 200880011539.X, 4 pages.
Office Action & Translation dated Mar. 17, 2011 for Chinese Application No. 200880011539.X, 5 pages.

(Continued)

*Primary Examiner* — Brian Healy
*Assistant Examiner* — Mary El Shammaa
(74) *Attorney, Agent, or Firm* — Turocy & Watson, LLP

(57) ABSTRACT

Regarding an optical pulse reshaping device of CPF type, there are subjects to reduce the number of stages by enhancing a compression efficiency as extremely higher for one stage of the CPF with maintaining a quality of an output pulse as high, and to be able to improve a degree of multiplexing by obtaining an output pulse having a Gaussian function for both of a time waveform therefor and a frequency waveform therefor. By using a normal dispersion HNLF in place of a zero dispersion HNLF, which configures the conventional CPF, it becomes able to overcome the above mentioned subjects. Moreover, it becomes able to reduce the number of fusion splice for a fiber, and to reduce a propagation loss of the CPF, by enhancing the compression efficiency as higher.

20 Claims, 17 Drawing Sheets

OTHER PUBLICATIONS

Takahashi Inoue et al., Optical Pulse 1-13 Compression Based on Stationary Rescaled Pulse Propagation in a COmblike Profiled Fiber, Journal of Lightwave Technology, Jul. 2006, vol. 24, No. 7.
International Search Report for PCT Application Serial No. PCT/JP2008/056102, 1 page.
S. V. Chernikov et al., "Soliton pulse compression in dispersion-decreasing fiber" Opt. Lett., vol. 18, No. 7, pp. 476-478 (1993).
S.V. Chernikov et al., "Comblike dispersion-profiled fiber for soliton pulse train generation" Opt. Lett., vol. 19, No. 8, pp. 539-541 (1994).
European Search Report mailed Sep. 25, 2012 for EP Application Serial No. 08739220.5, 9 pages.
Kibler, et al. "Parabolic pulse generation in comb-like profiled dispersion decreasing fibre", Electronics Letters, vol. 42, No. 17, Aug. 17, 2006, 2 pages.
Nicholson, et al. "Pulsed and continuous-wave supercontinuum generation in highly nonlinear, dispersion-shifted fibers", Applied Physics B: Lasers and Optics, vol. 77, No. 2-3, 2003, 8 pages.
Chernikov, et al. "Comblike dispersion-profiled fiber for soliton pulse train generation", Optics Letters, Optical Society of America, Washington D.C., vol. 19, No. 8, Apr. 15, 1994, pp. 539-541.
Office Action dated Sep. 30, 2010 for Chinese Application No. 200880011539.X, 4 pages.

* cited by examiner

OPTICAL PULSE RESHAPING DEVICE, OPTICAL PULSE LIGHT SOURCE, SUPER-CONTINUUM LIGHT GENERATOR AND METHOD FOR SUPER-CONTINUUM LIGHT GENERATION

CROSS-REFERENCE TO RELATED APPLICATIONS

This application is a US national stage filing of patent cooperation treaty (PCT) Appln. No. PCT/JP2008/056102 (WO 2008/126703), filed Mar. 28, 2008, which claims priority to Japanese patent application No. 2007-104264, filed on Apr. 11, 2007, the entire content of which are incorporated herein by reference.

TECHNICAL FIELD

The present invention relates to an optical pulse reshaping device for obtaining a preferred waveform by compressing a time waveform of an optical pulse, an optical pulse light source to use such the compressed optical pulse, a super-continuum light generator and a method for a super-continuum light generation. More specifically it relates to an optical pulse reshaping device for generating an ultrashort optical pulse to be used for a high speed optical communication system, or for generating an ultrashort optical pulse to be used for a material processing or for other intended uses, to an optical pulse light source therefor, to a super-continuum light generator therefor, and to a method for the super-continuum light generation.

BACKGROUND ART

In recent years, in an optical communication field in which a demand for high speed and larger capacity is high, for realizing a processing with a higher speed, a use of an ultrashort optical pulse is progressed, of which pulse width is a couple of pico seconds or not longer than that. Such the ultrashort optical pulse is used as an information transmission media regarding the optical communication. And then it is able to realize an ultrafast transmission by transmitting an optical pulse to be added information thereinto with a short time interval of a couple of pico seconds or not longer than that.

Moreover, an investigation is actively progressed in recent years for searching a new potentiality in such the field, because it is able to use the ultrashort optical pulse as an optical pulse having not only a short width but also a high energy, for such as working upon a material, for observing a characteristic of a material in a high accuracy, or the like.

While, as a method for directly generating an ultrashort optical pulse, there are generally known a method that a signal is superimposed to an applied current of a semiconductor laser diode (LD) and then an intensity of an output light is directly modulated, and a method that an intensity of a continuous light wave (CW) output from an LD is modulated using an external modulator. However, there is an upper limit on a speed of response for the LD itself, for the semiconductor for generating an electric signal to be a modulation signal, or for the external modulator, and then it is quite hard to generate directly the ultrashort optical pulse having the width of not longer than a couple pico seconds. Thus, a new method for generating an ultrashort optical pulse is investigated, and then there become provided a variety of methods therefor as a result in recent years.

As a new method for generating an ultrashort optical pulse for example, there is provided a method for performing a reshaping to be a preferred waveform by compressing a width of an optical pulse to be a seed, with using a nonlinear effect (the Kerr effect) of an optical fiber and using a dispersion effect thereof. Here, performing a reshaping to be a preferred waveform by compressing a width of an optical pulse is hereinafter referred to as compressing an optical pulse, or to as a compression of an optical pulse. It is known that it is able to realize a compression of a pulse having a high quality using a dispersion decreasing fiber (DDF) of which a dispersion value of the fiber is decreased in a longitudinal direction thereof, or using a comb-like dispersion profiled fiber (CDPF) to be configured by connecting alternately a dispersion-shifted fiber (DSF) having a dispersion value as zero and a single mode fiber (SMF), by a method for compressing a pulse which is so-called as an adiabatic soliton compression, among heretofore known some methods for compressing a pulse.

Here, the pulse having the high quality means the pulse that a pulse shape thereof is fitted in a high accuracy to a sech function for example, and that a pedestal (which means an element not to be fitted to a shape of the function thereof at a foot part of the pulse as generally larger than a value of the function to be attenuated for a time delay), a nonlinearity of a frequency chirp (a time variation of an instantaneous frequency), or the like, are small. Here, sech $x=2/(e^x+e^{-x})$.

However, regarding the above mentioned DDF, it is not easy technically to realize a preferred characteristic thereof, and then it is at a state as difficult to put it to practical use, because of a low yield and a high manufacturing cost thereof.

On the contrary, regarding the CDPF, it is expected to put it to practical use, as there are advantages that it is easy to manufacture it, and that it is able to suppress the manufacturing cost thereof, because it is configured using two types of fibers for transmission.

Here, the compression of a pulse using the DDF or the CDPF is disclosed in nonpatent documents 1 and 2 respectively. Moreover, as a developed type of the CDPF, there is provided a comb-like profiled fiber (referred to as a CPF hereinafter) comprised of a configuration that a highly nonlinear dispersion-shifted fiber (HNL-DSF), which has a dispersion to be negligible and has a larger nonlinearity, or simply a highly nonlinear fiber (HNLF) is used in place of the DSF, and then the HNLF and the SMF are alternately connected to therebetween. Such the CPF gathers attention because it becomes able to realize a high compression efficiency with a shorter fiber length, and there is disclosed in a nonpatent document 3 regarding a detail thereof including a method for designing a compressor thereof.

[Nonpatent Document 1] S. V. Chernikov et al., "Soliton pulse compression in dispersion-decreasing fiber" Opt. Lett., Vol. 18, No. 7, pp. 476-478 (1993).

[Nonpatent Document 2] S. V. Chernikov et al., "Comblike dispersion-profiled fiber for soliton pulse train generation" Opt. Lett., Vol. 19, No. 8, pp. 539-541 (1994).

[Nonpatent Document 3] T. Inoue et al., "Optical Pulse Compression Based on Stationary Resealed Pulse Propagation in a Comblike Profiled Fiber" J. Lightwave Technol., Vol. 24, No. 7, pp. 2510-2522 (2006).

DISCLOSURE OF INVENTION

Problems to be Solved by the Invention

Here, in a case of increasing the number of stages at the time of performing the compression of the pulse using such as the CDPF, the CPF, or the like, it is known that the compression characteristic becomes to be close to that of the adiabatic soliton compression in the DDF, and then it is able to obtain the sech pulse having the high quality.

However, in the case of increasing the number of stages for such as the CDPF, the CPF, or the like, it is not desirable for a characteristic of a compressor, as a size of the compressor becomes larger, or as a total value of a connection loss becomes increased due to increasing the number of points to fusion splice between fibers to each others, or the like. Moreover, a problem occurs, such as increasing a labor hour and a cost at a period of manufacturing therefor.

On the contrary, the waveform of the sech function attenuates linearly corresponding to an increase of a time period or a frequency thereof on a logarithmic axis. In a case where an optical pulse is multiplied in a time domain therefor or in a frequency domain therefor, as taking into consideration of overlapping the pulses each other, generally a limitation occurs on a density to be multiplied.

Therefore, for improving a multiple density thereof, it is further preferable to use a waveform of a Gaussian function (Gaussian waveform) for an amplitude thereof to be attenuated as quadratically corresponding to the increase of the time period or the frequency thereof on the logarithmic axis. Here, the Gaussian function means a function having a form of $\exp(-a x^2)$.

However, not only in a case where the CDPF or the CPF having finite stages is used, but also in a case of performing a compression of a pulse using the DDF, any method for obtaining a pulse of a Gaussian waveform is not heretofore known.

Here, the present invention is presented with having regard to the above mentioned problems, and the first object thereof is to propose an optical pulse reshaping device, an optical pulse light source therefor, a super-continuum light generator therefor, and a method for the super-continuum light generation, for being able to reduce the number of stages by enhancing a compression efficiency as extremely higher for one stage of a CPF with maintaining a quality of an output pulse as high.

Moreover, the second object of the present invention is to propose an optical pulse reshaping device, an optical pulse light source therefor, a super-continuum light generator therefor, and a method for the super-continuum light generation, for being able to improve a degree of multiplexing by obtaining an output pulse having a Gaussian function for both in a time domain therefor and a frequency domain therefor.

Means for Solving the Problem

A first aspect according to the present invention for solving the above mentioned subjects is an optical pulse reshaping device which is characterized in that the optical pulse reshaping device comprises: a nonlinear medium having a normal dispersion effect; and an anomalous dispersion medium, with connecting to alternately therebetween, wherein a dispersion value and an effective length of the nonlinear medium is determined for generating a nonlinear effect and a dispersion effect regarding the nonlinear medium with an approximately similar degree of magnitude therebetween.

A second aspect according to the present invention is the optical pulse reshaping device which is characterized in that a specification of an input seed pulse, of the nonlinear medium and of the anomalous dispersion medium is specified individually, for an output pulse waveform from the optical pulse reshaping device to comply with a Gaussian function.

A third aspect according to the present invention is the optical pulse reshaping device which is characterized in that the nonlinear medium is an optical fiber.

A fourth aspect according to the present invention is the optical pulse reshaping device which is characterized in that the nonlinear medium is a highly nonlinear optical fiber.

A fifth aspect according to the present invention is the optical pulse reshaping device which is characterized in that the anomalous dispersion medium is an optical fiber.

A sixth aspect according to the present invention is the optical pulse reshaping device which is characterized in that the anomalous dispersion medium is a single mode optical fiber.

A seventh aspect according to the present invention is the optical pulse reshaping device which is characterized in that the anomalous dispersion medium is a diffraction grating.

An eighth aspect according to the present invention is the optical pulse reshaping device which is characterized in that the diffraction grating is a fiber bragg grating.

A ninth aspect according to the present invention is the optical pulse reshaping device which is characterized in that the anomalous dispersion medium is a single mode optical fiber, a length of the highly nonlinear optical fiber is approximately similar to a dispersion length and is approximately as three times as a nonlinear length, and a length of the single mode optical fiber is approximately similar to the dispersion length.

A tenth aspect according to the present invention is the optical pulse reshaping device which is characterized in that the anomalous dispersion medium is a single mode optical fiber, the length of the highly nonlinear optical fiber is as 1.17 times as the dispersion length and is as 3.3 times as the nonlinear length, and the length of the single mode optical fiber is as 1.29 times as the dispersion length.

An eleventh aspect according to the present invention is an optical pulse light source comprising the optical pulse reshaping device.

A twelfth aspect according to the present invention is a super-continuum light generator comprising the optical pulse light source.

A thirteenth aspect according to the present invention is a method for a super-continuum light generation comprising the steps of: inputting a pulse of Gaussian function into a normal dispersion HNLF (highly nonlinear fiber), which is output from an optical pulse light source comprising an optical pulse reshaping device, which is configured using a nonlinear medium having a normal dispersion effect and an anomalous dispersion medium, with connecting to alternately therebetween, and determines a dispersion value and an effective length of the nonlinear medium for generating a nonlinear effect and a dispersion effect regarding the nonlinear medium with an approximately similar degree of magnitude therebetween; and generating a super-continuum light having a flat spectrum.

The present invention is the one obtained by improving the conventional CPF, and it is extremely characterized in that a normal dispersion HNLF is used in place of a zero dispersion HNLF which configures the conventional CPF.

Effects of the Invention

Because of the configuration described in each of the above mentioned aspects according the present invention, it becomes able to enhance a compression efficiency as higher for one stage of a CPF with maintaining a quality of an output pulse as high.

Moreover, a waveform of the output pulse is a Gaussian function for both in a time domain therefor and a frequency domain therefor, and then it becomes able to improve a degree of multiplexing therefor.

Furthermore, it becomes able to obtain a remarkable effect to solve the problems all at once regarding the conventional technologies by enhancing the compression efficiency as higher, such as being able to reduce the number of fusion splice for a fiber, being able to reduce a propagation loss of a CPF, or the like.

BEST MODE FOR CARRYING OUT THE INVENTION

Each of the above mentioned aspects according to the present invention will be described in detail below, based on the drawings.

The First Embodiment

Figure 1:
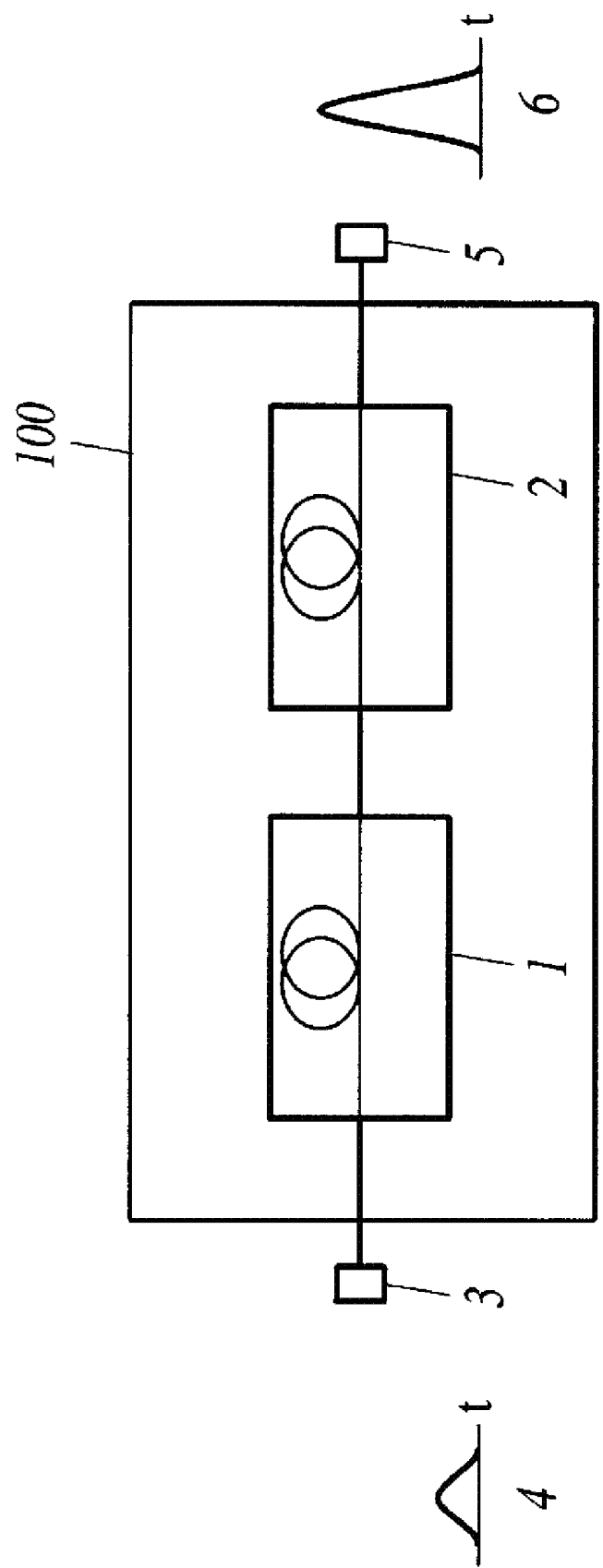
FIG. 1 is a system configuration diagram according to the present invention.

FIG. 1 is a system configuration diagram regarding an optical pulse reshaping device 100 according to the present invention.

As shown in FIG. 1, the optical pulse reshaping device 100 is configured by connecting a nonlinear medium 1 having a normal dispersion effect and an anomalous dispersion medium 2 alternately therebetween, and then in a case of inputting a seed pulse 4 from an input unit 3, an optical pulse 6 to be compressed is output from an output unit 5. Here, one pair of the nonlinear medium 1 and the anomalous dispersion medium 2 is defined to be as one stage regarding the optical pulse reshaping device according to the present invention.

Moreover, the above mentioned nonlinear medium 1 having the normal dispersion effect is configured normally by using an optical fiber for which a silica glass is used as a base.

Further, in a case where it is required for the nonlinear medium 1 having the normal dispersion effect to have a high nonlinearity in particular, a highly nonlinear optical fiber is used therefor.

Here, the high nonlinearity means that a nonlinearity $\gamma$ is assumed to be as $\gamma > 3(1/\text{W/km})$. Here, $\gamma = (2\pi/\lambda)(n2/\text{Aeff})$, wherein the $\lambda$ is a wavelength of light in vacuum, and the n2 and the Aeff are the Kerr coefficient of the fiber and an effective cross section thereof respectively. Moreover, regarding the HNLF to be used for the above mentioned CPF, the dispersion effect is small enough to be almost negligible, and then it may be able to consider that a zero dispersion HNLF is used therefor.

Further, as the above mentioned nonlinear medium 1 having the normal dispersion effect, it is also able to use a photonic crystal fiber (PCF) or a device of waveguide type as a medium of which a refractive index is proportional to a strength of an electric field, instead of the nonlinear optical fiber. Still further, the nonlinear optical fiber, for which the silica glass is used as the base, has a smaller propagation loss, and a nonlinear figure of merit, which is defined as a ratio of the nonlinearity for the propagation loss, is the maximum among the nonlinear media of fiber type including the PCF. Furthermore, it is easy to perform a dispersion control precisely, it becomes able to realize the zero dispersion or a normal dispersion to be desired regarding the present invention, and then it is the optimum as a nonlinear medium for the present invention. On the contrary, the PCF, for which another glass than the silica is used as the base, such as a lead glass, a bismuth glass, a chalcogenide glass, or the like, has a larger propagation loss and it is difficult to perform the dispersion control. However, it has the nonlinearity as several orders of magnitude larger than that of the silica glass type, and then it is able to design a fiber length to be remarkably shorter as a nonlinear medium for the present invention.

Here, as the above mentioned anomalous dispersion medium 2, normally an optical fiber is used.

For such the optical fiber, a single mode optical fiber is well used, and the reason therefor is because the propagation loss and the nonlinearity thereof are smaller, and because it has further larger value of anomalous dispersion.

Moreover, as the above mentioned anomalous dispersion medium 2, it is able to use a diffraction grating as well.

Still further, as the above mentioned diffraction grating, it is able to use a fiber bragg grating (FBG).

Furthermore, as the above mentioned diffraction grating, it is able to use a wavelength dispersion medium as well, wherein such as a prism or the like is used therefor.

Thus, the above mentioned system configuration is similar to the configuration of the conventional CPF, except the point that the nonlinear medium 1 has the normal dispersion effect. And then a method for a basic design of the CPF is pursuant to the method disclosed in the nonpatent document 3. Here, the method for designing the CPF to configure the present invention will be described in detail later, with using the method which is disclosed in such the document. And then the result which is obtained by embodying the present invention will be described in detail first, according to the second embodiment.

The Second Embodiment

An HNLF and an SMF are used for the nonlinear medium 1 having the normal dispersion effect and for the anomalous dispersion medium 2 respectively, as shown in FIG. 1, and then a CPF according to the present invention is configured.

Figure 2:
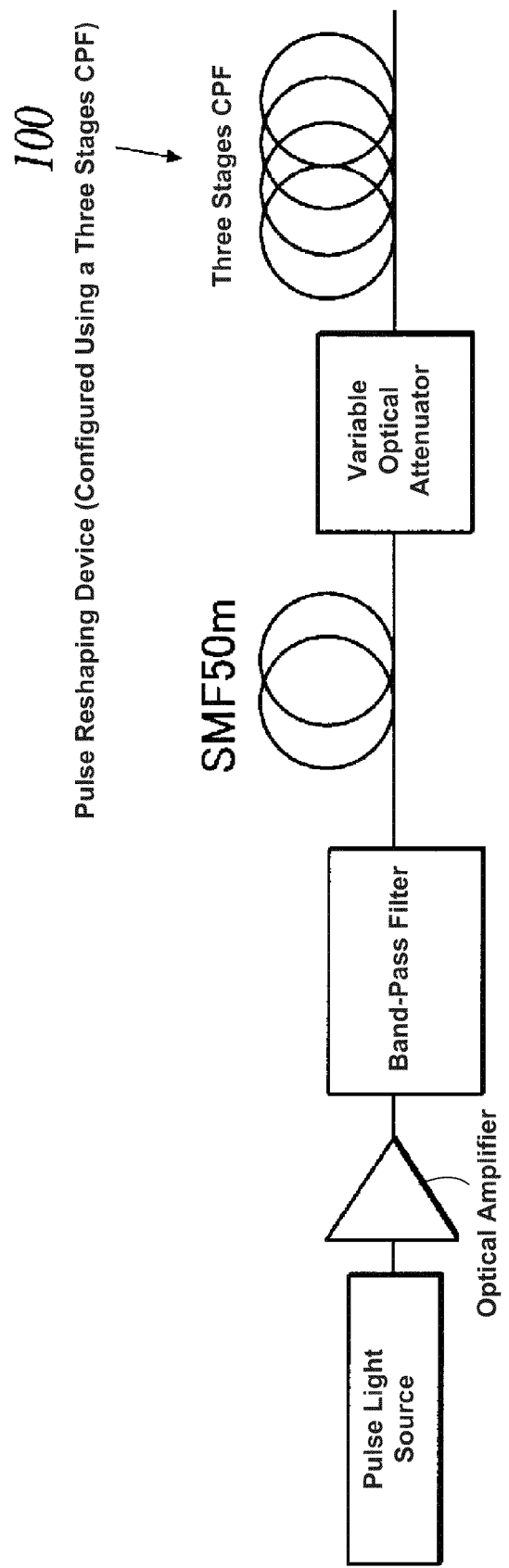
FIG. 2 is an experiment system diagram of an optical pulse reshaping device according to the present invention.

Here, specifications of the HNLF and the SMF configuring the CPF is shown in Table 1. And then under such the conditions, an optical pulse reshaping device according to the present invention is manufactured, which is comprised of a configuration of a three-stages CPF. Moreover, an experiment regarding a compression of a pulse is performed using an experiment system as shown in FIG. 2 (Here, the propagation loss for the whole of the manufactured three-stages CPF is 0.5 dB). Here, the dispersion value, the nonlinearity and the propagation loss regarding the SMF is assumed to be as 16.3 ps/nm/km, 1.3 $W^{-1}$ $km^{-1}$ and 0.2 dB/km respectively.

Figure 3A:
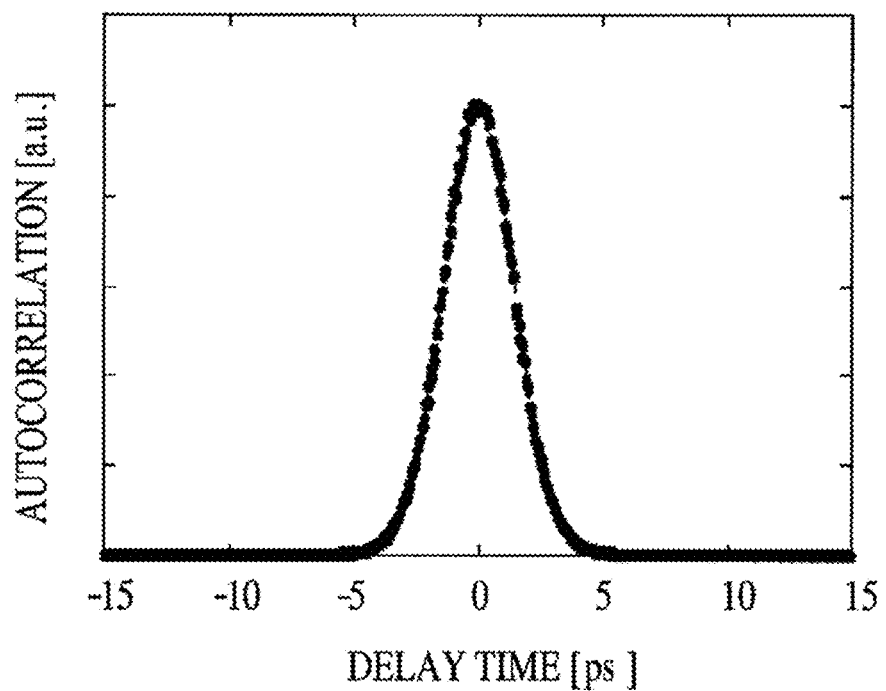
FIG. 3A is an autocorrelation waveform diagram of a band-pass filter output pulse regarding an optical pulse reshaping device according to the present invention.
Figure 3B:
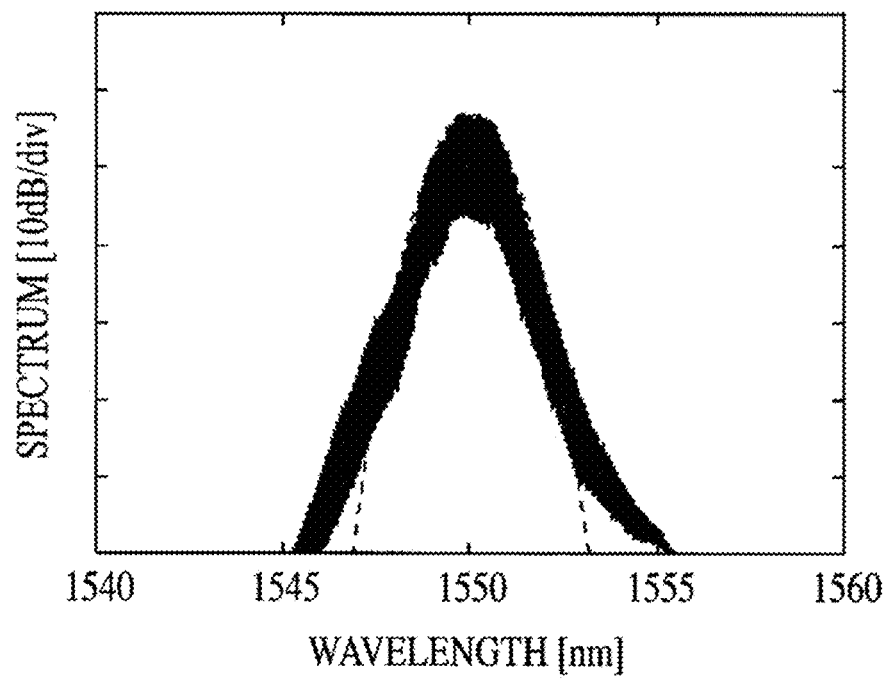
FIG. 3B is an optical spectrum diagram of the band-pass filter output pulse regarding the optical pulse reshaping device according to the present invention.

Here, a semiconductor mode locked laser is used as a pulse light source, which has a repetition frequency of 10 GHz. And then after amplifying a power of an optical pulse using an optical amplifier, the pulse is passed through a band-pass filter (BPF) for removing a noise of a spontaneous emitted light. Here, an autocorrelation waveform and an optical spectrum regarding a BPF output pulse is shown in FIG. 3A and FIG. 3B respectively. In the figures, the dotted lines show functions for each of the waveforms to be fitted to Gaussians (Gaussian functions) respectively.

In a case of fitting the autocorrelation waveform and the spectrum using the Gaussian-functions respectively, a parameter for each of the fitting functions corresponds to a full width at half maximum for the power of the time waveform as 2.37 ps and a 3 dB bandwidth for the spectrum as 0.182 THz respectively. Therefore, a time-bandwidth product therefor is determined as 0.430.

Figure 4A:
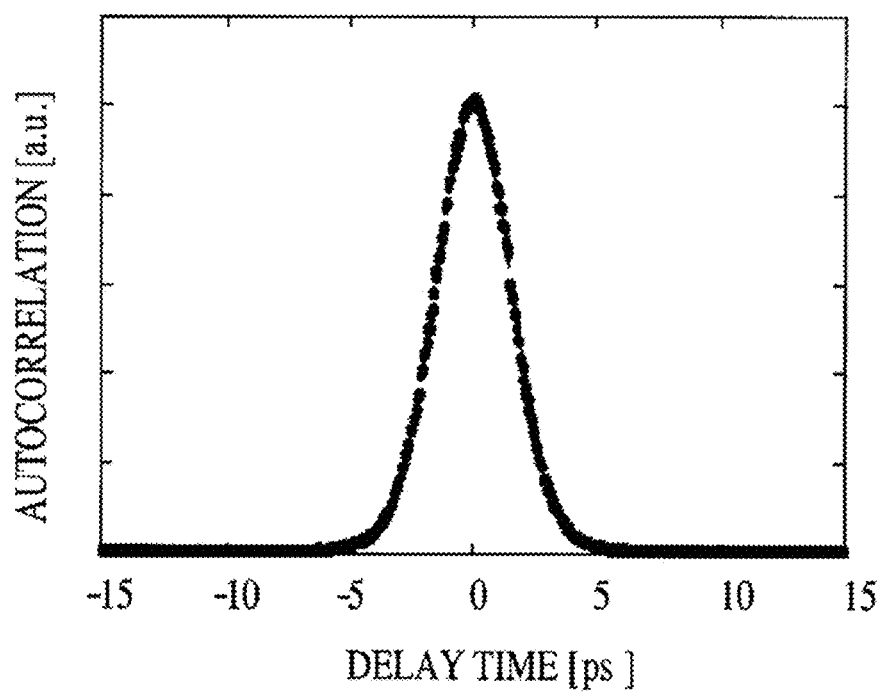
FIG. 4A is an autocorrelation waveform diagram of an SMF 50 m output pulse.
Figure 4B:
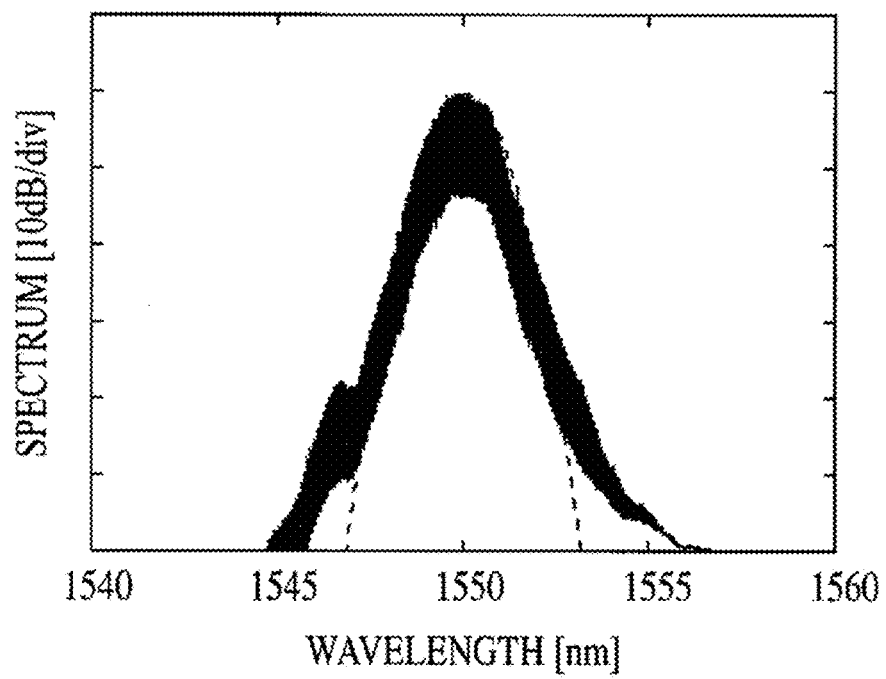
FIG. 4B is an optical spectrum diagram of the SMF 50 m output pulse.
Figure 5A:
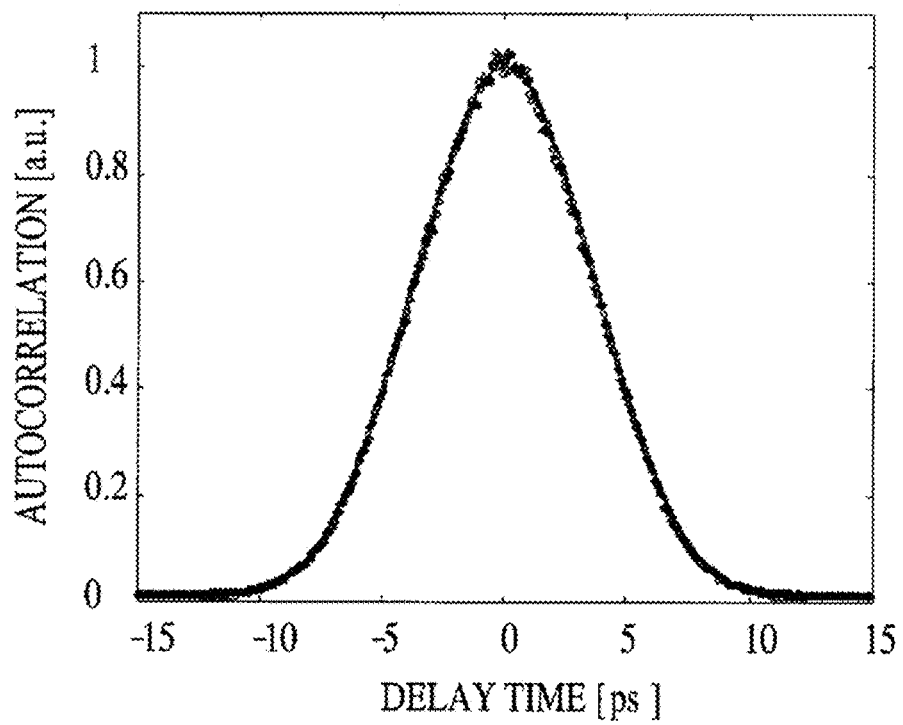
FIG. 5A is an autocorrelation waveform diagram of a first stage HNLF output pulse regarding an optical pulse reshaping device according to the present invention.
Figure 5B:
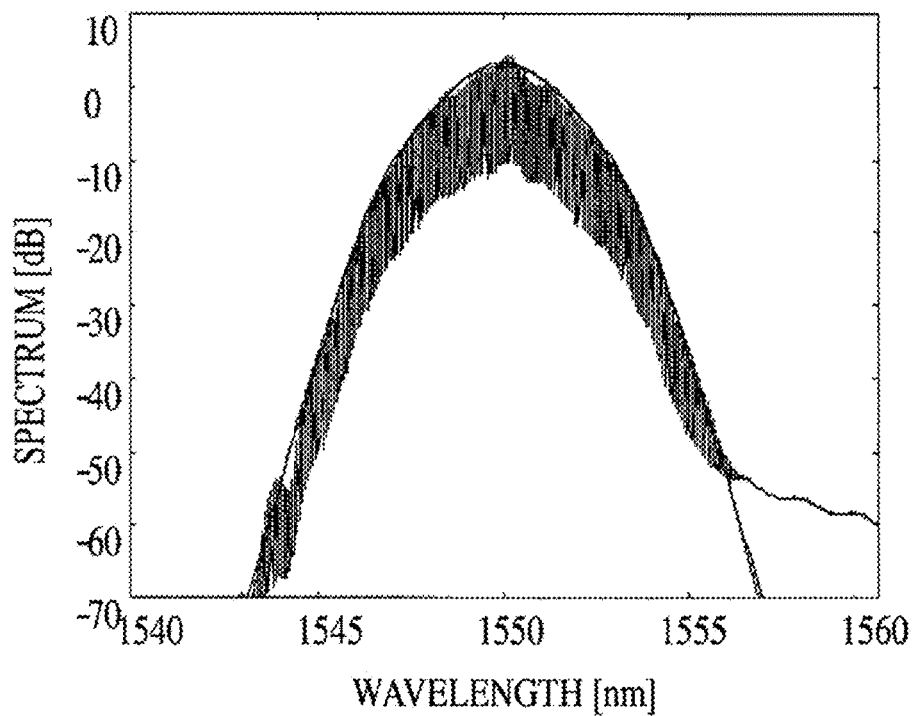
FIG. 5B is an optical spectrum diagram of the first stage HNLF output pulse regarding the optical pulse reshaping device according to the present invention.
Figure 6A:
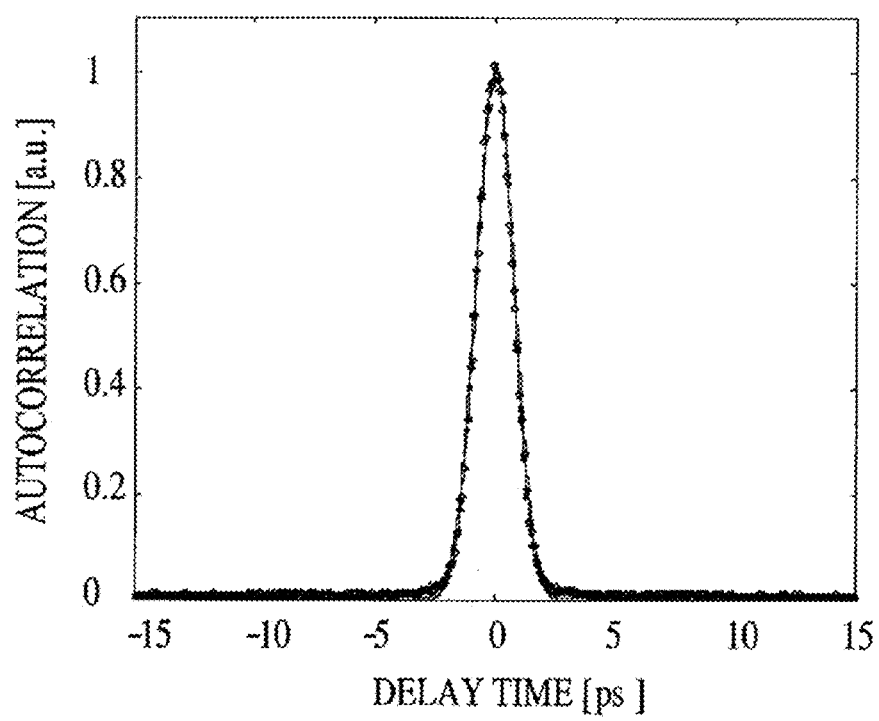
FIG. 6A is an autocorrelation waveform diagram of a first stage SMF output pulse regarding an optical pulse reshaping device according to the present invention.
Figure 6B:
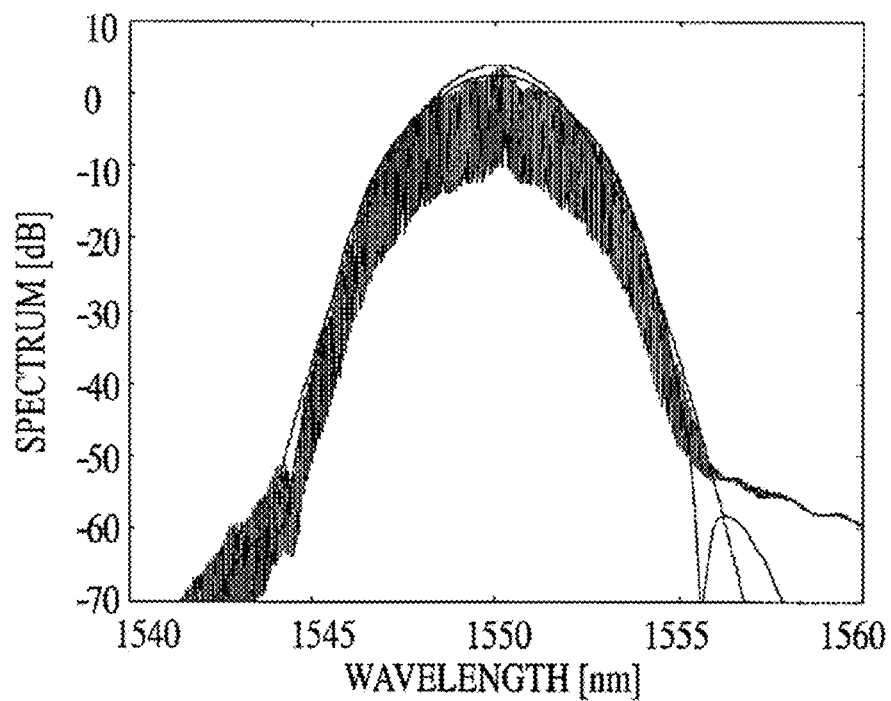
FIG. 6B is an optical spectrum diagram of the first stage SMF output pulse regarding the optical pulse reshaping device according to the present invention.
Figure 7A:
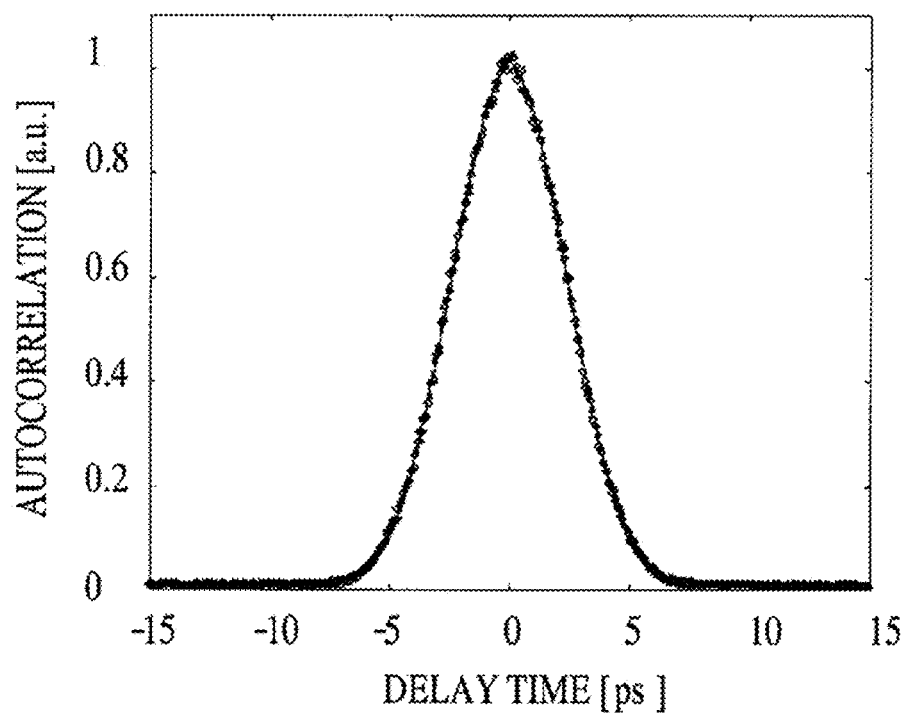
FIG. 7A is an autocorrelation waveform diagram of a second stage HNLF output pulse regarding an optical pulse reshaping device according to the present invention.
Figure 7B:
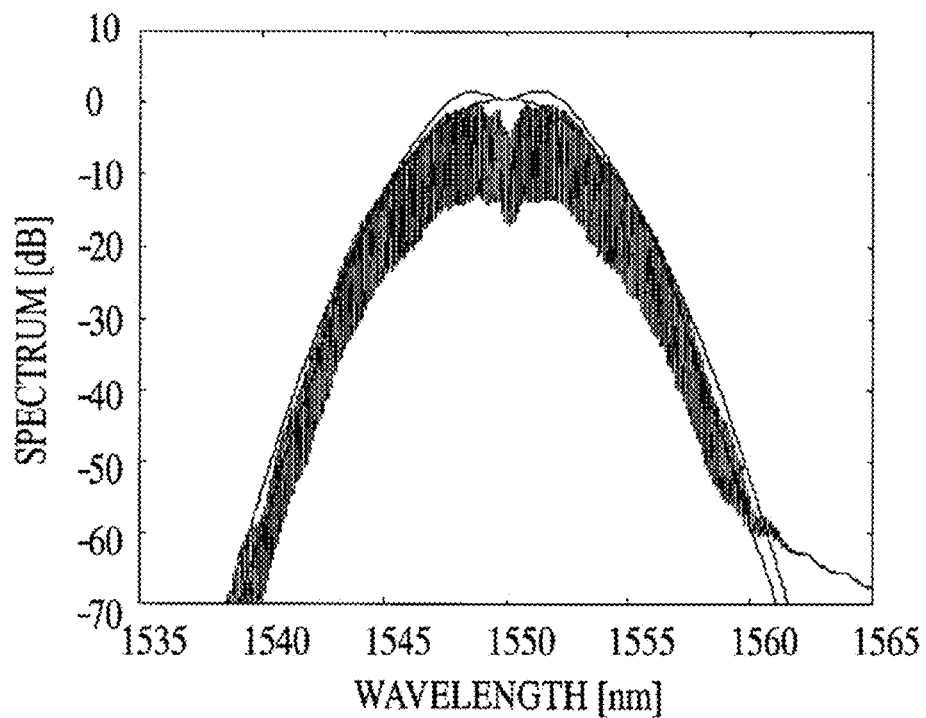
FIG. 7B is an optical spectrum diagram of the second stage HNLF output pulse regarding the optical pulse reshaping device according to the present invention.
Figure 8A:
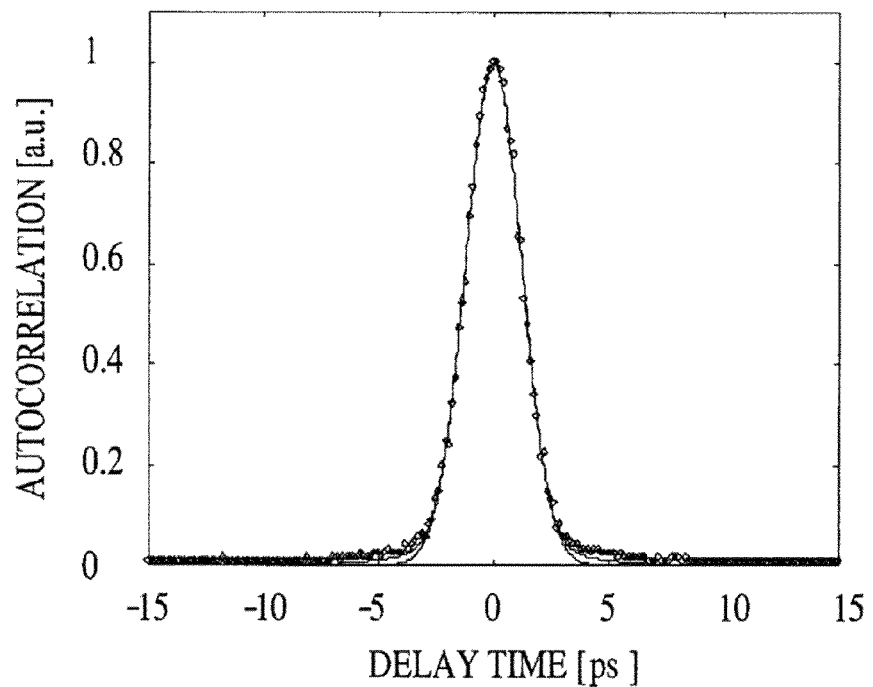
FIG. 8A is an autocorrelation waveform diagram of a second stage SMF output pulse regarding an optical pulse reshaping device according to the present invention.
Figure 8B:
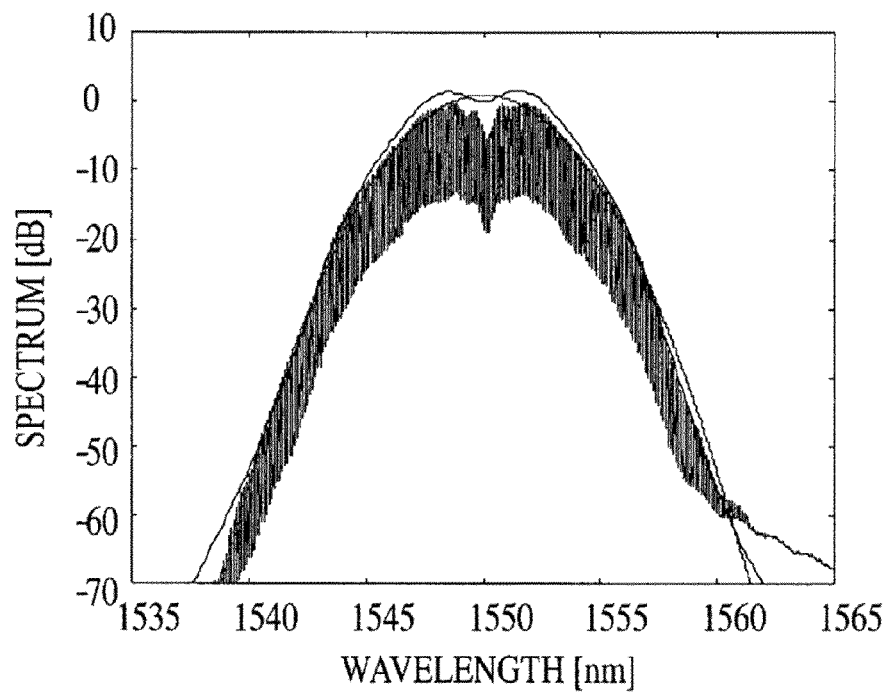
FIG. 8B is an optical spectrum diagram of the second stage SMF output pulse regarding the optical pulse reshaping device according to the present invention.
Figure 9A:
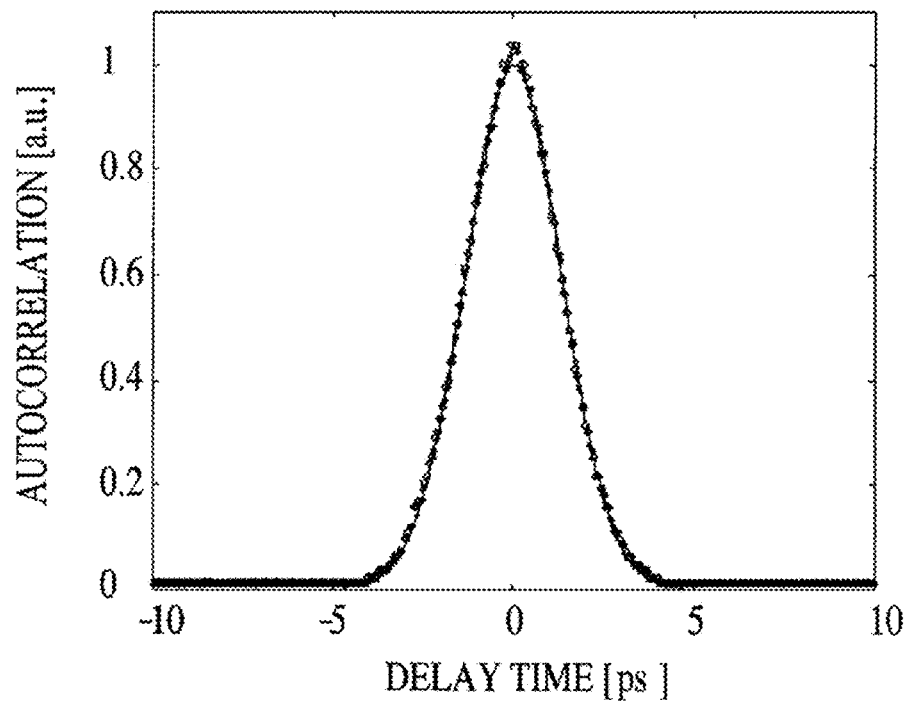
FIG. 9A is an autocorrelation waveform diagram of a third stage HNLF output pulse regarding an optical pulse reshaping device according to the present invention.
Figure 9B:
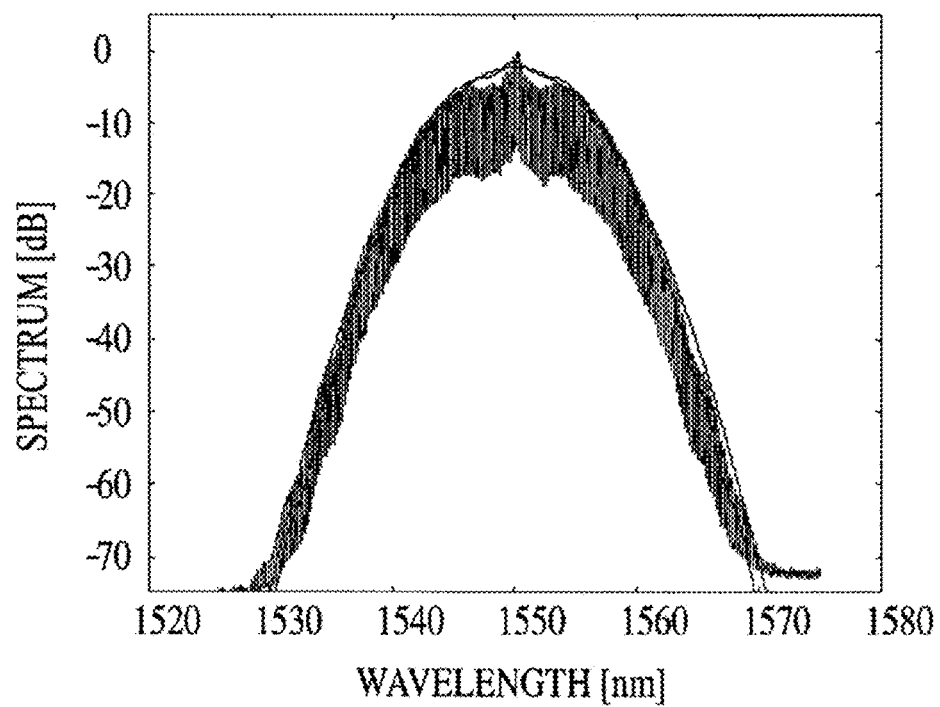
FIG. 9B is an optical spectrum diagram of the third stage HNLF output pulse regarding the optical pulse reshaping device according to the present invention.

Next, a waveform after propagating an SMF 50 m is shown in FIG. 4A and FIG. 4B. As similar thereto, the dotted lines show functions for each of the waveforms to be fitted to Gaussians (Gaussian functions) respectively.

Here, the full width at half maximum for the power of the time waveform is estimated as 2.57 ps and the 3 dB bandwidth for the spectrum is estimated as 0.177 THz according to the Gaussian fitting. Therefore, the time-bandwidth product therefor is determined as 0.454.

The measurement result regarding each of output pulse waveforms at the first stage to the third stage of the HNLF and of the SMF to configure the present invention is shown in FIG. 5A to FIG. 10B respectively, wherein a seed pulse having the above mentioned characteristic is input thereinto, of which waveform is shown in FIG. 4A and FIG. 4B respectively.

Here, a mean input power into the third-stages CPF is adjusted to be as 20 dBm by using a variable optical attenuator.

Here, individual dotted lines as shown in each of the above figures is a Gaussian fitting function therefor respectively. And, it is obvious that each of the waveforms is fitted to the Gaussian function very well.

Thus, it becomes clear that the above described effects according to the present invention are remarkably realized thereby.

Here, as summarizing the pulse width as the full width at half maximum (FWHM), the spectrum width and the time-bandwidth product regarding the CPF input pulse and the individual stage output pulse, there are shown in the following Table 2 respectively.

TABLE 1

| | HNLF | | | | SMF |
|---|---|---|---|---|---|
| | DISPERSION VALUE (ps/nm/km) | NONLINEARITY (1/W/km) | PROPAGATION LOSS (db/km) | LENGTH (m) | LENGTH (m) |
| FIRST STAGE | −21.75 | 11.6 | 0.63 | 100 | 143 |
| SECOND STAGE | −16.08 | 12.0 | 0.77 | 53.0 | 53.0 |
| THIRD STAGE | −8.84 | 13.0 | 0.99 | 36.0 | 16.5 |

TABLE 2

PARAMETERS OF CPF INPUT PULSE AND OUTPUT PULSE FROM EACH STAGE

|  | FWHM (ps) | 3 dB BANDWIDTH (THz) | TIME-BANDWIDTH PRODUCT |
|---|---|---|---|
| INPUT | 2.57 | 0.177 | 0.45 |
| FIRST STAGE HNLF OUTPUT | 6.07 | 0.340 | 2.07 |
| FIRST STAGE SMF OUTPUT | 1.27 | 0.340 | 0.43 |
| SECOND STAGE HNLF OUTPUT | 3.95 | 0.592 | 2.34 |
| SECOND STAGE SMF OUTPUT | 0.81 | 0.582 | 0.47 |
| THIRD STAGE HNLF OUTPUT | 2.21 | 1.032 | 2.29 |
| THIRD STAGE SMF OUTPUT | 0.39 | 1.062 | 0.41 |

Figure 11:
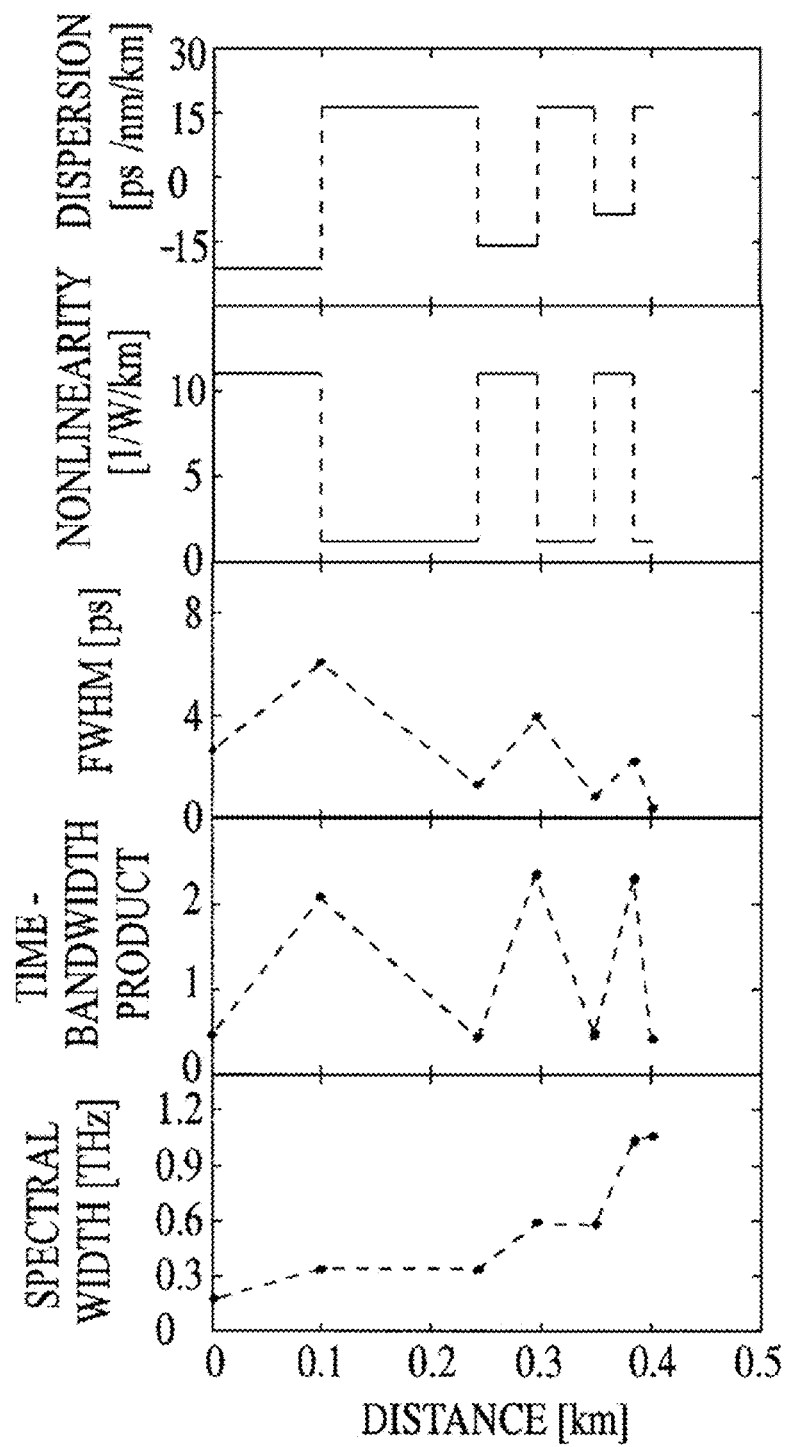
FIG. 11 is a plot diagram of a fiber dispersion value, a nonlinearity, a pulse width, a time-bandwidth product and a spectrum width regarding a CPF for a longitudinal direction of a fiber.

As plotting the result as shown in Table 2 for a longitudinal direction of the CPF, with the dispersion value of the CPF and the nonlinearity thereof as shown in Table 1, there is shown in FIG. 11.

That is to say, FIG. 11 shows the dispersion value of a fiber, the nonlinearity, a pulse width, a time-bandwidth product and a spectrum width regarding the CPF for a longitudinal direction of the fiber.

According Table 2 and FIG. 11, the pulse width of the HNLF output from each stage is not less than two times as wide as the width of the input pulse for each stage regarding the above mentioned CPF. On the contrary, according to the conventional CPF using the HNLF having the zero dispersion, there is almost no change in the pulse width between input and output of the HNLF. Thus, it becomes clear that the propagation characteristics of the pulse regarding the CPF according to the present invention is quite different from that for the CPF of the conventional type.

The above mentioned phenomenon sure is an appearance of the normal dispersion effect regarding the nonlinear medium as a principal object according to the present invention.

Here, as paying attention to the autocorrelation waveform of the third stage SMF output pulse, it is clear that the Gaussian pulse is obtained, which has a high quality as a peak pedestal ratio of 19.3 dB. Moreover, it is clear that the spectrum of the Gaussian shape is obtained regarding the spectrum waveform as well.

It is not able to obtain at all such the characteristics according to the compression of the pulse using the conventional CDPF, the CPF, or the DDF. And then such point sure is the remarkable aspect according to the present invention.

Moreover, according to the conventional CDPF or the CPF, there is a tendency that the quality of the output pulse becomes deteriorated in a case of reducing the number of the stages.

That is to say, in a case of designing a compressor by which it is able to obtain a predetermined compression ratio therefor, there is a relation of trade off that a quality of a pulse becomes improved instead of decreasing a compression efficiency for one stage in a case where the number of stages is large, on the contrary, the quality thereof becomes deteriorated instead of improving the compression efficiency for one stage in a case where the number of the stages is small.

Such relation is disclosed in the nonpatent document 3 according to both of the theory and the experiment. Here, the compression ratio means a ratio of a width of an output pulse for a width of an input pulse, and it means that the width of the output pulse is reduced in a case where such the value thereof is larger than one.

Moreover, in a case of increasing the number of the stages of such as the CDPF, the CPF, or the like, it is able to obtain an output pulse having a high quality. However, it is not necessarily a realistic method because a labor hour and a cost at a period of manufacturing therefor become increased.

On the contrary, according to the present invention, there is proposed a technique to compress to a Gaussian pulse having a high quality regarding a CPF having the number of stages as less.

Here, it is able to explain such a revolutionary phenomenon according to the present invention as described below.

That is to say, it is considered that the normal dispersion effect and the nonlinear effect are generated in approximately the same degree of magnitude at the same time in the HNLF. Next, an action occurs continuously, that a new frequency element is added thereto as an up chirp, with extending a width of a pulse with having an up chirp as well. And then a generation of a nonlinear chirp is prevented thereby. Thus, it is considered that it becomes able to obtain the chirp, which is close to the linear shape, and the pulse waveform of the Gaussian shape therefor.

Next, a result of the above mentioned experiment according to the present invention is shown in Table 3, with comparing to the experiment result of the compression of the pulse with using the conventional type CPF, which is described in the literature of M. Takahashi et al., "Supercontinuum spectrum broadening by one-bobbin compact modules comprised of re-coated comb-like profiled fiber and HNLF", Proceeding of Optical Fiber Communication Conference (OFC) 2007, Paper OTuJ4, Anaheim, U.S.A., 2007. According to such the table, it is obvious further clearly regarding the advantages according to the present invention.

According to the above mentioned literature, a pulse is compressed to a pulse of sech function type having a width of 0.5 ps, with using the six-stages CPF following the condition for the input pulse as similar to the experiment according to the present invention. Moreover, according to the conventional type CPF regarding the above mentioned literature, the dispersion value of the HNLFs used at all of the stages is −0.39 ps/nm/km, and the length of the HNLF of 20.5 m for the first stage CPF corresponds to as 0.95 times as a nonlinear length and as 0.0045 time as a dispersion length. In such the case thereof, a ratio of the fiber length regarding the HNLF for the dispersion length has an order of magnitude obviously different from that for the nonlinear length. And then it becomes clear that there is almost no action of the dispersion effect but the nonlinear effect only acts thereto. Here, definitions of the nonlinear length and of the dispersion length will be described later.

TABLE 3

COMPARISON BETWEEN INVENTION CPF AND CONVENTIONAL TYPE CPF

|  | PRESENT INVENTION CPF | CONVENTIONAL TYPE CPF |
|---|---|---|
| NUMBER OF CPF STAGES | THREE STAGES | SIX STAGES |
| PULSE WAVEFORM | GAUSSIAN TYPE | SECH TYPE |
| PEAK PEDESTAL RATIO | 19.3 dB | ~15 dB |
| TOTAL COMPRESSION RATIO | 6.48 | 5.00 |
| MEAN COMPRESSION RATIO FOR ONE STAGE | 1.86 | 1.31 |
| TOTAL CUMULATIVE | 0.119 | 1.769 |

TABLE 3-continued

COMPARISON BETWEEN INVENTION CPF AND CONVENTIONAL TYPE CPF

|  | PRESENT INVENTION CPF | CONVENTIONAL TYPE CPF |
|---|---|---|
| DISPERSION VALUE (ps/nm) | | |
| LOSS (dB) | 0.5 | 0.6 |

According to Table 3, it becomes clear that the compression of the pulse becomes realized regarding the CPF according to the present invention, which has the higher efficiency and the higher quality comparing to that of the conventional type CPF.

Moreover, according to the CPF regarding the present invention which has the number of stages as less, it becomes able to obtain the loss as a less value comparing to that of the conventional type CPF, because of the number of the fusion splice therefor as less.

Furthermore, it becomes able to obtain the propagation loss of the fiber with a small value as almost negligible, because the fiber length thereof is shorter.

On the contrary, there is a problem that a timing jitter is increased in a case of compressing a width of a pulse train using such as the DDF, the CDPF, the conventional type CPF, or the like. Regarding such the problem that the timing jitter is increased according to the conventional type CPF, there is described in the literature of T. Inoue, "Study on Noise-induced Quality Degradation in Optical Pulse Compression Based on Comb-like Profiled Fiber", Proceeding of 32nd European Conference on Optical Communication (ECOC), Paper We3.P.24, Cannes, France, 2006.

Here, the timing jitter $\delta t^2$ in the case of the compression of the pulse using the N-stages CPF of the conventional type, which is configured using the HNLF having the zero dispersion and the SMF, is given by the following formula as disclosed in the above mentioned literature.

$$\delta t^2 = \delta t_0^2 + \delta f_0^2 (2\pi \beta_2^{SMF} \Sigma_{n=1}^N L_n^{SMF})^2 \quad \text{(Formula 1)}.$$

Here, the $\delta t_0^2$ and the $\delta f_0^2$ are the timing jitter and a central frequency jitter respectively, that the input pulse has. Moreover, the $\beta_2^{SMF}$ is the dispersion value of the SMF, and the $\Sigma_n L_n^{SMF}$ is a total length of the SMF which configures the CPF.

Such the formula means that the timing jitter increases corresponding to the cumulative dispersion value of the SMF in the conventional type CPF. However, this is derived based on the condition that the dispersion value is assumed to be zero, that the HNLF has, which configures the conventional type CPF. And then it makes more sense to consider that the timing jitter is determined to be exact according to the cumulative dispersion value of the whole of the CPF rather than that.

According to the above mentioned literature, there is described that the total length of the SMF becomes longer, and then the timing jitter of the output pulse train becomes larger as well, in the case of setting the compression ratio for one stage of the CPF to be as small for improving the quality of the pulse, and then of increasing the number of the stages therefor.

Here, comparing the total cumulative dispersion value for the whole of the CPF as shown in Table 3 regarding the CPF according to the present invention and the CPF of the conventional type, the value is extremely smaller for the CPF according to the present invention, and then it is able to expect that an increase of the time jitter is to be suppressed thereby.

As it is obvious according to the above described embodiment, it becomes able to enhance the compression efficiency as extremely higher for one stage of the CPF regarding the CPF optical pulse reshaping device according to the present invention, with maintaining the quality of the output pulse as high. Moreover, the waveform of the output pulse is the Gaussian type for both of the time waveform and the frequency waveform therefor, and then it becomes able to improve the degree of multiplexing thereof. Further, it becomes able to suppress the increase of the timing jitter at the time of compressing the pulse train, because it becomes able to maintain as small regarding the cumulative dispersion value for the whole of the CPF. Furthermore, it becomes able to obtain the remarkable advantages by enhancing the compression efficiency thereof, such as that it is able to reduce the number of fusion splice for the fiber, and that it becomes able to reduce the propagation loss of the CPF, or the like.

To summarize the above mentioned results, it becomes able to solve the problems all at once according to the present invention, that there are provided according to the conventional type CPF as described below.

(1) In a case of performing a compression of a pulse with a high efficiency using a CDPF or a CPF, which has the number of stages as less, a quality of an output pulse becomes to be deteriorated.

(2) On the contrary, in a case of increasing the number of the stages for the CDPF or the CPF, for improving the quality of the pulse, a manufacturing cost cannot help but be increased.

(3) In a case where a cumulative dispersion value is increased, a timing jitter becomes to be increased in a case of compressing a pulse train.

(4) Even in a case of performing an ideal adiabatic soliton compression using a DDF, a pulse to be obtained is a sech type. That is, it is not able to obtain a pulse waveform to be attenuated as quadratically corresponding to an increase of a time period or a frequency thereof respectively, comparing to such as the Gaussian type. And then it is not able to realize a degree of multiplexing in a case of multiplexing the pulse in the time domain or the frequency thereof, which is to be expected at the time of using the pulse of the Gaussian type.

The Third Embodiment

Figure 12:
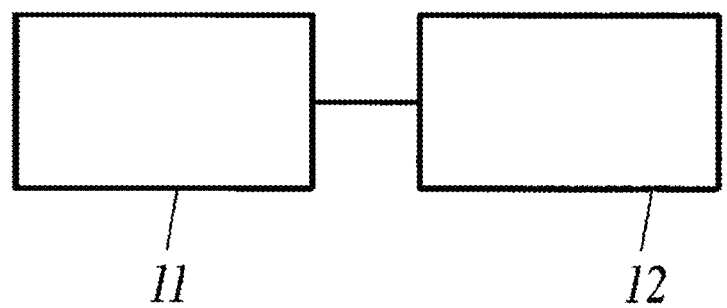
FIG. 12 is an explanatory diagram showing one embodied example regarding an optical pulse reshaping device according to the present invention to be used as an optical pulse light source.

FIG. 12 is an explanatory diagram of one embodied example showing another aspect according to the present invention. In FIG. 12, a symbol 11 designates an optical pulse light source for which the compression of the pulse according to the present invention is used. Moreover, a symbol 12 therein designates a device for which an ultrashort optical pulse is used, which is input from the optical pulse light source.

By amplifying the ultrashort optical pulse to be a higher energy level, which is obtained according to the present invention, it becomes able to give the pulse a peak power as high.

Moreover, by using such the characteristic that it provides the strong peak power in a short time period as not longer than one pico second, it becomes able to realize an ultrashort pulse processing machine having a high performance. Further, it is able to expect it to be used for a medical field, such as a dental operation or the like, in place of a laser.

It is able to use the present invention for the light source 11 of such the device 12 to which the ultrashort optical pulse is applied.

Still further, it is able to use the present invention for a super-continuum (SC) light source. In particular, according to the present invention, as described above, it becomes able to obtain the output pulse having the Gaussian function for both in the time domain therefor and the frequency domain therefor. And then it becomes able to improve the degree of multiplexing. Thus, it becomes able to use it for the SC as a multiple wavelength light source for a wavelength division multiplexing (WDM) optical communication.

Furthermore, as described in the literature of S. Taccheo et al., "Investigation and Design Rules of Supercontinuum Sources for WDM Applications", Proceeding of Optical Fiber Communication Conference (OFC) 2000, Paper ThA1, Baltimore, U.S.A., 2000, in a case of performing a generation of a super-continuum (SC) light using a normal dispersion fiber, it is known that it is able to obtain a flat spectrum thereof with using a pulse of a Gaussian type as a seed light source, comparing to the case of using a pulse of a sech function type. Therefore, according to manufacturing a pulse light source for which the optical pulse reshaping device according to the present invention is used, and then by using a pulse of the Gaussian type as an input pulse, which is generated thereby, it is expected that it becomes able to generate an SC light having the flat spectrum therefor.

Figure 10A:
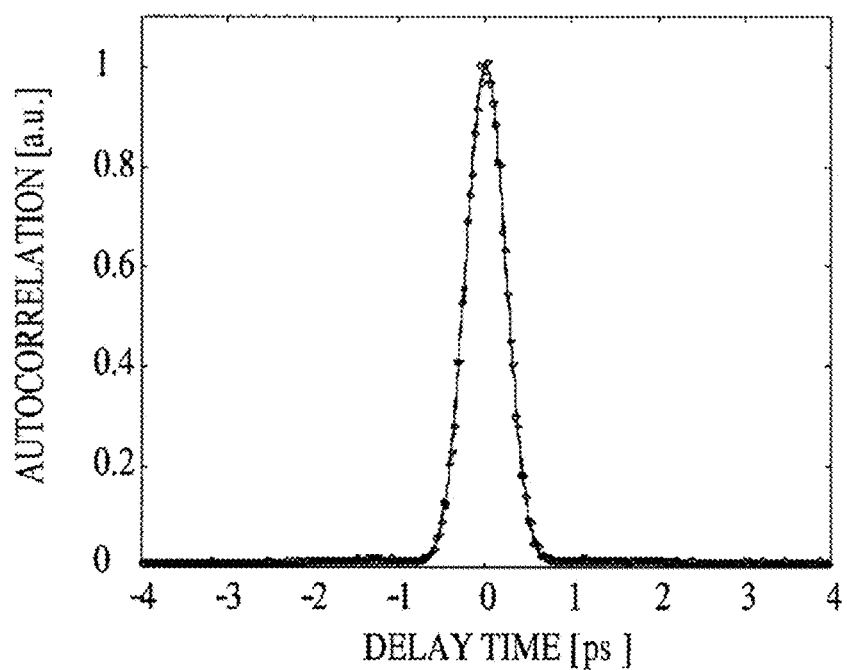
FIG. 10A is an autocorrelation waveform diagram of a third stage SMF output pulse regarding an optical pulse reshaping device according to the present invention.
Figure 10A:
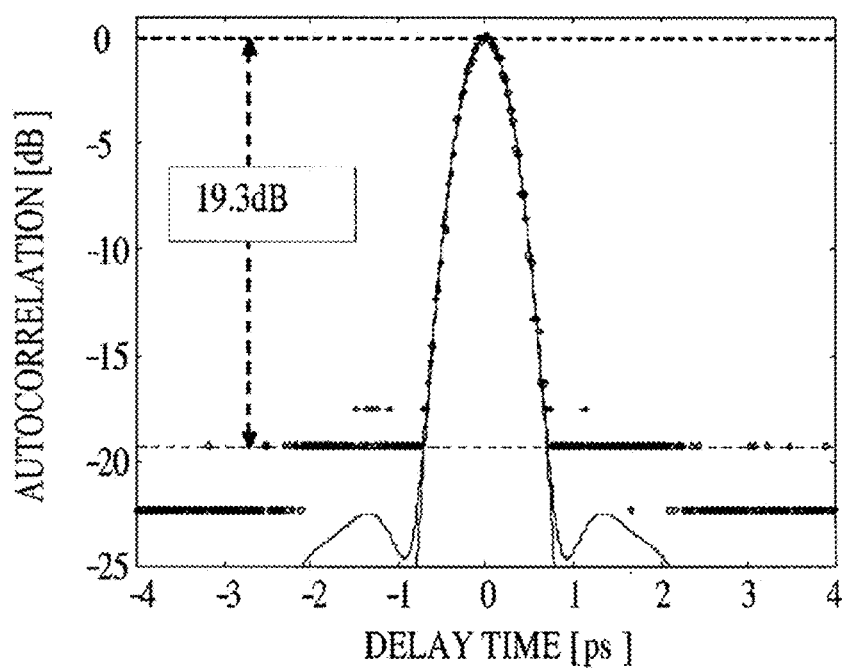
Figure 10B:
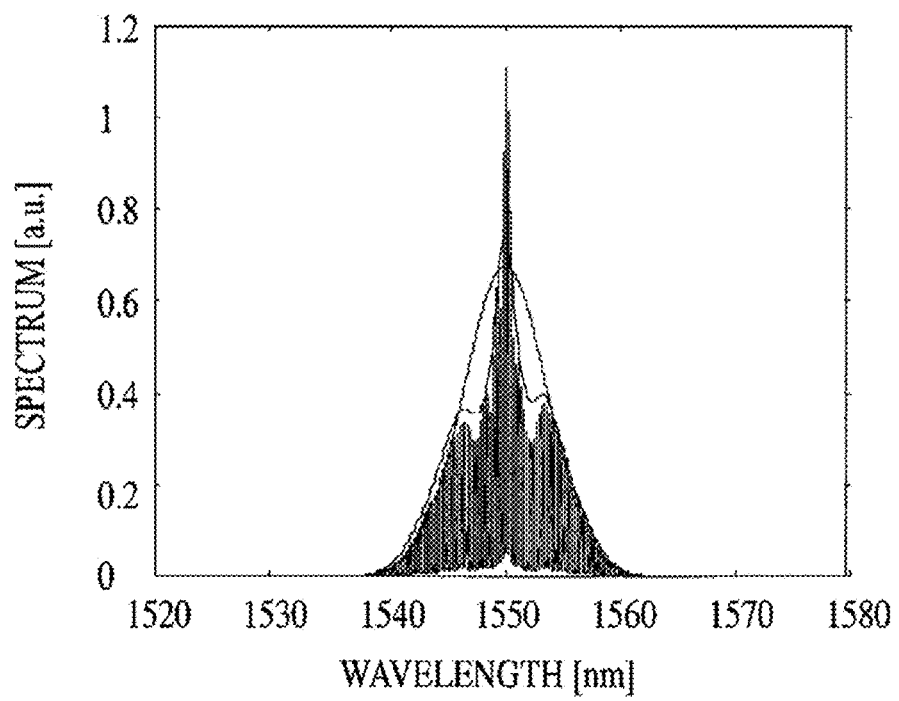
FIG. 10B is an optical spectrum diagram of the third stage SMF output pulse regarding the optical pulse reshaping device according to the present invention.
Figure 10B:
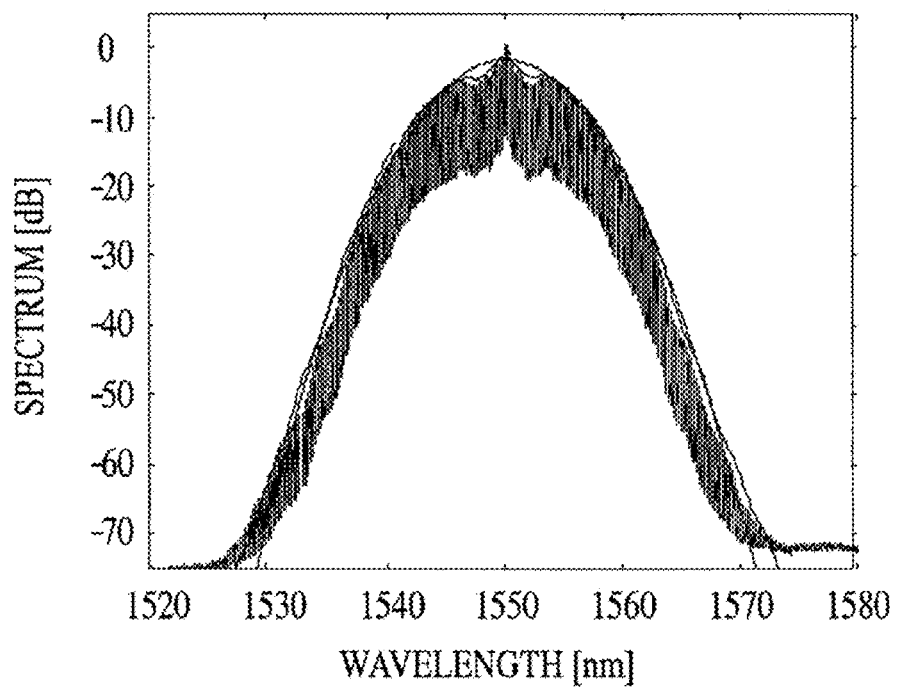
Figure 13:
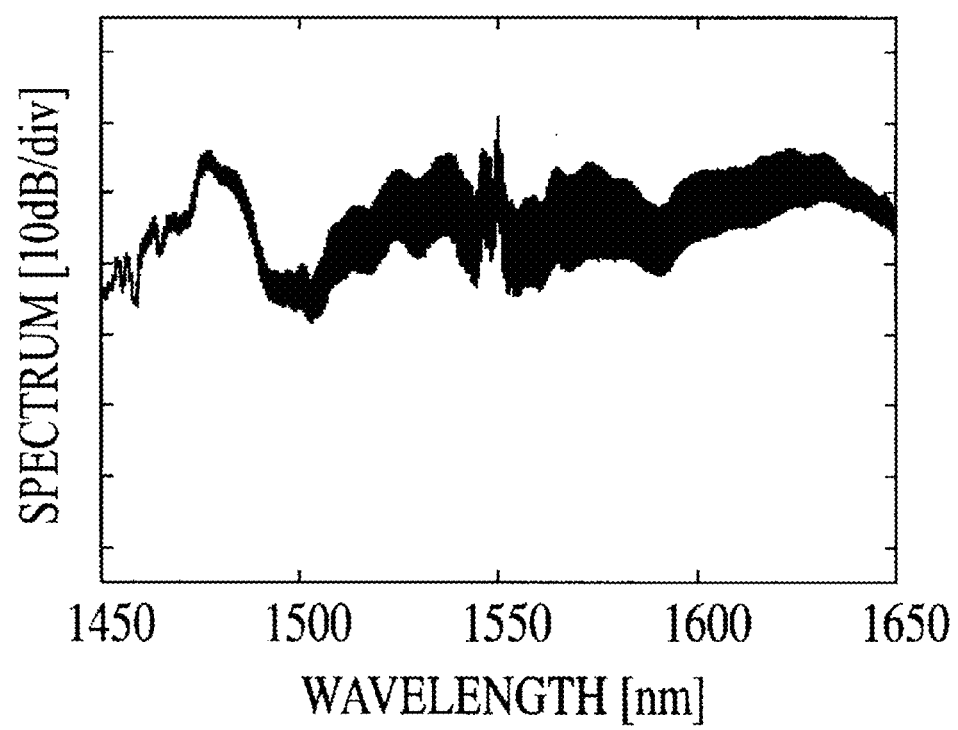
FIG. 13 is a spectrum waveform diagram of an SC light generated by using an optical pulse reshaping device according to the present invention.

Next, FIG. 13 is a result that the light pulse, which is compressed using the CPF according to the present invention and has the waveform as shown in FIG. 10A and FIG. 10B, is input into the normal dispersion HNLF, and then a spectrum of the output light therefrom is measured. Such the HNLF has a length of 100 m, a dispersion value of −0.10 ps/nm/km, a nonlinearity of 15.8 $W^{-1} km^{-1}$, and a propagation loss of 1.1 dB/km. According to FIG. 13, it is clear that the spectrum is spread over a wide band range of not narrower than 100 nm, and that an excellent SC light is generated thereby.

As described previously, regarding the CPF as disclosed in the present invention, it may use a diffraction grating as an anomalous dispersion medium for giving the anomalous dispersion effect as similar thereto, in place of the SMF.

In particular, in a case where a fiber bragg grating is used, it is able to configure an optical pulse reshaping device as a fiber type for all thereof. And then it becomes able to obtain many advantages, such as unnecessary to align an optical axis, being able to design a size of the optical pulse reshaping device to be smaller, or the like.

Thus, there are described in detail regarding the embodiments according to the present invention, and described regarding the effects according to the present invention.

Next, by using the method which is disclosed in the above mentioned nonpatent document 3, a design for the CPF to be used in the embodiments according to the present invention will be described in detail below.

The method disclosed in the above mentioned nonpatent document 3 is a method to perform a designing of a CPF in more specifically, with using a stationary resealed pulse (referred to as an SRP hereinafter) which is a nonlinear stationary pulse that the present inventors discovered. The detail regarding such the method is described in the above mentioned document. Here, designing processes thereof will be described in detail below.

Figure 14:
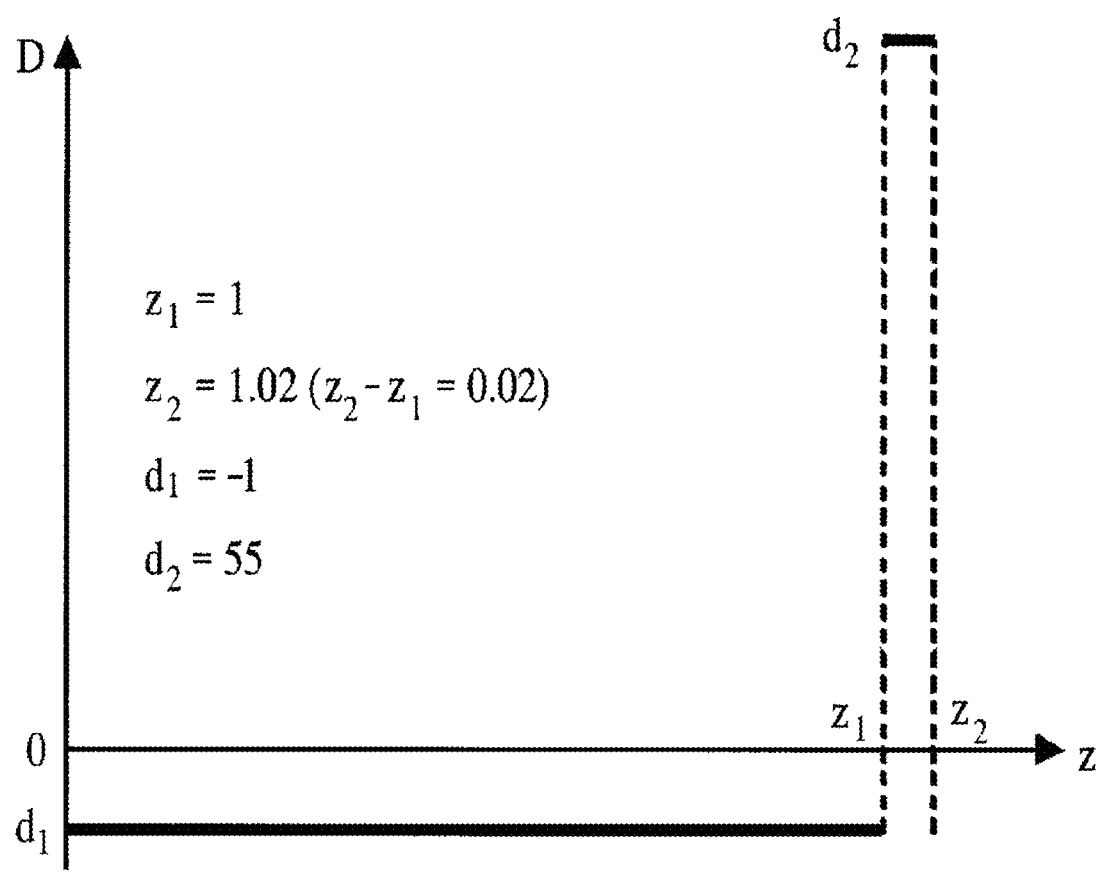
FIG. 14 is an explanatory diagram showing a transmission path in a normalized space regarding an optical pulse reshaping device according to the present invention.

(1) First, setting a transmission path in a normalized space as shown in FIG. 14.

(2) Next, assuming an optical pulse to propagate through such the transmission path, and then specifying a behavior of the above mentioned optical pulse (that is to say, the SRP), with assuming that an amplitude of a complex envelope therefor is determined by using a nonlinear Schrodinger equation as described below, and then by evaluating a nonlinear stationary solution thereof.

(3) And, determining a configuration of an actual CPF for obtaining a desirable compression pulse, by applying a characteristic of the SRP to a real space thereafter.

Next, a method for a calculation of the SRP following the above mentioned designing processes will be described in detail below.

FIG. 14 shows a transmission path in a normalized space, which is comprised of a configuration of one stage of the CPF. Here, a symbol D designates a dispersion value of a fiber, and then symbols of a positive and a negative correspond to an anomalous dispersion and a normal dispersion therefor respectively. Moreover, a symbol z designates a distance in a longitudinal direction of a fiber. Moreover, the dispersion value D and the distance z are normalized values for both thereof. And then each of the values reflect a change in the nonlinearity of the fiber in the longitudinal direction thereof and an effect of a power attenuation due to a fiber loss as well. Meanwhile, each of such the values does not correspond to a fiber dispersion in a real space for the longitudinal direction as one to one in principle.

Here, it is assumed that an amplitude of a complex envelope q(z, t) for an optical pulse at a distance z is determined by using a nonlinear Schrodinger equation of i $(\partial q/\partial z)+(D/2)(\partial^2 q/\partial t^2)+|q|^2 q=0$. Moreover, in FIG. 13, a region of $0<z<z_1$ corresponds to the HNLF having the normal dispersion for the real transmission path (the symbol 1 in FIG. 1), and $z_1<z<z_2$ corresponds to the SMF having the value of the anomalous dispersion (the symbol 2 in FIG. 1).

Next, regarding such the transmission path, it is assumed that a peak power P=3.3, a pulse of sech function type, which has a full width at half maximum (FWHM) of the power $\Delta t=1.763$, is to be an input pulse, and that a compression ratio R=1.72, and then an SRP is to be evaluated.

Figure 15A:
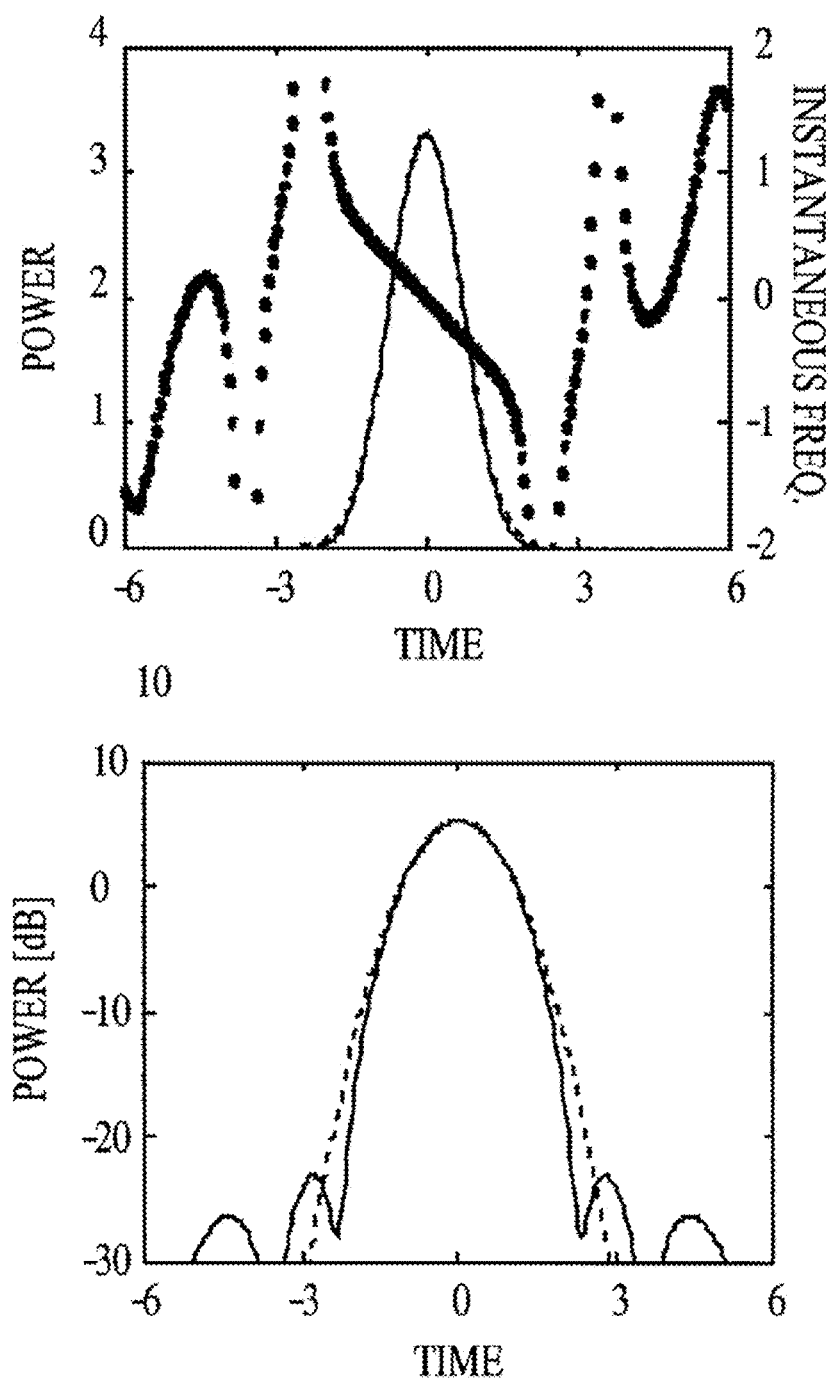
FIG. 15A is a diagram of an SRP waveform, and showing a time waveform (a solid line) and an instantaneous frequency (dots) thereof respectively.
Figure 15B:
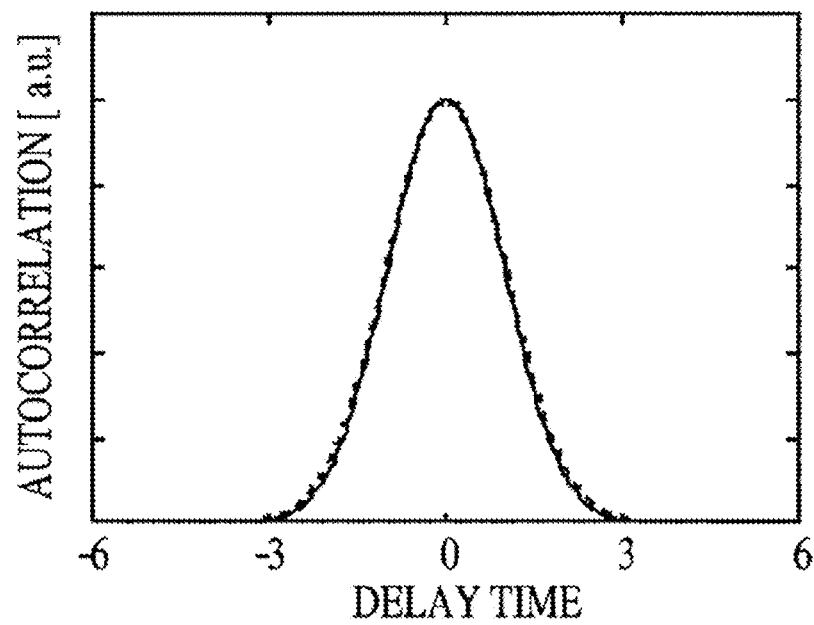
FIG. 15B is a diagram of an SRP waveform, and showing an autocorrelation waveform thereof.
Figure 15B:
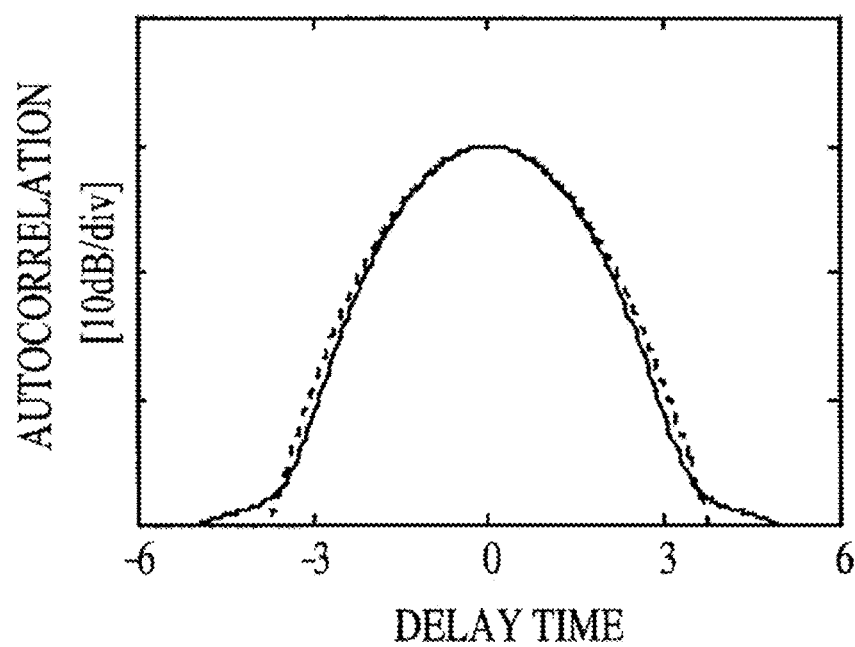
Figure 15C:
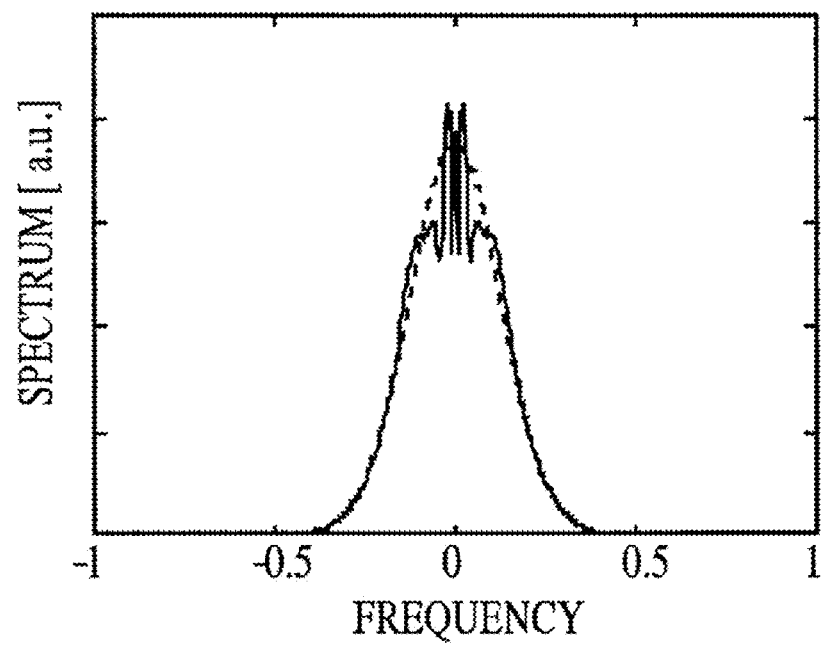
FIG. 15C is a diagram of an SRP waveform, and showing a spectrum thereof.
Figure 15C:
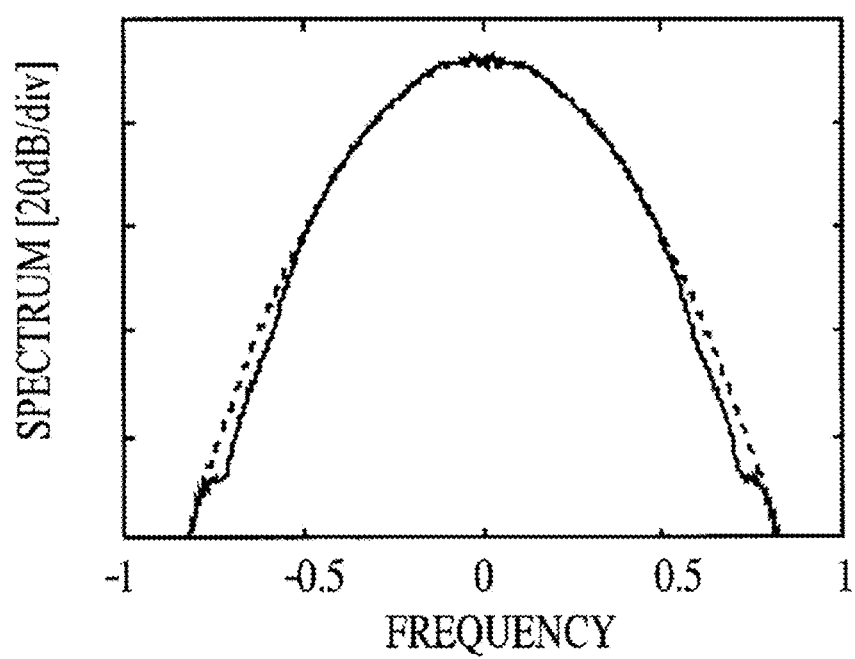

By calculating with applying a heretofore known method for averaging thereto, it becomes able to obtain each type of SRP waveforms as shown in FIG. 15A, FIG. 15B and FIG. 15C.

FIG. 15A, FIG. 15B and FIG. 15C are waveforms of the SRP, wherein FIG. 15A shows a time waveform (a solid line) and an instantaneous frequency (dots) thereof, FIG. 15B shows an autocorrelation waveform thereof, and FIG. 15C shows a spectrum thereof, respectively.

Moreover, each of upper figures designates with using a linear axis, meanwhile, each of lower figures designates with using a logarithmic axis. Further, each of dotted lines in the individual figures designates a fitting by using a Gaussian function.

According to FIG. 15A, FIG. 15B and FIG. 15C, it is clear that it is able to fit both of the time waveform and the frequency waveform precisely by using the Gaussian functions therefor. Moreover, it is able to mention that a chirp at around a center of the pulse is approximately linear. Further, regarding the FWHM, the $\Delta t=1.684$, a parameter of the linear chirp C=−0.445.

Here, the parameter of the linear chirp C is defined as $C=(\Delta t^2)(4 \ln 2)^{-1} \partial\omega/\partial t|_{t=0}$, with using a gradient of the instantaneous frequency at t=0 as $\partial\omega/\partial t|_{t=0}$.

Moreover, a case where the parameter of the linear chirp is negative means that the pulse has a down chirp (for the instantaneous frequency to be reduced in terms of time) as shown in the upper figure of FIG. 15A. And then a pulse width thereof is estimated to be as $\Delta t_0=\Delta t(1+C^2)^{-1/2}=1.539$ in a case where the pulse becomes to be at a state of Fourier transform limit by assuming that the chirp is completely compensated.

Regarding the above mentioned conditions, as paying attention to the length of the individual transmission paths as shown in FIG. 14, the length of the nonlinear fiber $z_1=1$ is 1.17 times as long as the dispersion length, and 3.3 times as long as the nonlinear length. Moreover, the length of the anomalous dispersion fiber $z_2-z_1=0.02$ is 1.29 times as long as the dispersion length. Here, a nonlinear length zNL and a dispersion length $z_D$ of any fiber are given by $z_{NL}=1/P$, $z_D=\Delta t_0^2/(4 \ln 2 |d|)$ respectively, with using the pulse width □t0 at the time of Fourier transform limit, the peak power P of the pulse at z=0, and the dispersion value d of the fiber corresponding thereto. Further, an effective length of the nonlinear medium, such as a highly nonlinear fiber or the like, is defined as a ratio of a real length for a nonlinear length. For example, in a case of an optical fiber, as assuming the fiber length as z1, the effective length is given by $z_1/z_{NL}$. And then according to the above mentioned example, $z_1/z_{NL}=3.3$, which means that an amount of a nonlinear phase shift is 3.3 rad at a time (t=0) for giving a peak intensity of an optical pulse in a case where the dispersion effect is not considered. That is to say, the effective length of the nonlinear medium means the maximum value of the amount of the nonlinear phase shift to be accumulated in the optical pulse in a case of neglecting the dispersion effect. Still further, all of such the definitions are applicable to an effective length regarding a dispersion effect as similar thereto, and then it is able to use a dispersion length in place of the nonlinear length.

Furthermore, for designing a CPF, even in a case of a realistic transmission path, with using a parameter of an input pulse at each stage of the CPF, by setting a length of an HNLF, a value of a normal dispersion and a value of a nonlinearity respectively, for the length of the HNLF to be 1.17 times as long as the dispersion length and to be 3.3 times as long as the nonlinear length, and by setting a length of an SMF to be 1.29 times as long as the dispersion length as well, it becomes able to realize a pulse compression of self-similar type, which has a compression ratio as 1.72 for one stage thereof, and for a waveform of the individual output pulses thereof to correspond with the SRP waveforms as shown in FIG. 15A, FIG. 15B and FIG. 15C respectively.

Here, the important point is that the length of the HNLF is 1.17 times as long as the dispersion length and 3.3 times as long as the nonlinear length. This point indicates that the nonlinear length and the dispersion length regarding the HNLF have the orders of magnitude as similar therebetween, and then the nonlinear effect and the dispersion effect become to be generated as approximately similar in the HNLF inside.

Exactly such the point is the first aspect according to the present invention, and this is nothing more or less than the point that the magnitudes of the nonlinear effect and of the dispersion effect regarding the above mentioned nonlinear medium are generated similarly therebetween.

Moreover, regarding the evaluation of the SRP waveform as shown above, it is able to obtain the waveform as similar to that in the case of the peak power therefor as 3.3, even in a case of changing the peak power therefor as between 2.8 and 4.0. Such the point means that it is not necessary for the length of the HNLF to be exactly correspondent to the 3.3 times of the nonlinear length, but a certain amount of error is allowed, if it has a length as close thereto.

Further, it becomes able to obtain the SRP having the waveform as similar thereto even in a case where the value of the lengths (z2–z1) of the anomalous dispersion fiber is fluctuated approximately 10% at the transmission path as shown in FIG. 14. Such the point means that it is not necessary for the length of the SMF to be exactly correspondent to the 1.29 times of the dispersion length, but a certain amount of error is allowed, if it has a length as close thereto.

Here, according to the knowledge to be obtained as above, a design to be performed regarding a three-stages CPF, which has a compression ratio for one stage as R=1.72, will be described as below.

Regarding an input pulse, a chirp free Gaussian pulse is assumed therefor, which has a repetition frequency of 10 GHz and a pulse width as $\Delta t_0=2.5$ ps, and a mean power thereof is assumed to be as 100 mW. And then a peak power of the pulse in such the case thereof becomes to be as 3.8 W.

Here, a case where a pulse is chirp free means that the pulse is at a state of Fourier transform limit. In such a case, the linear chirp parameter C for such the pulse is zero. And then for making it to be –0.445 as the value of the SRP, it is to be propagated through the SMF having a length of 48.3 m. As a result, it is able to calculate that the pulse width $\Delta t$ becomes to be as 2.74 (ps) and the peak power P becomes to be as 3.47 (W).

Moreover, a width of the third stage output pulse is $2.74/1.72^3=0.538$ (ps), and then it is able to calculate the width thereof, in a case where it is to be at the state of Fourier transform limit by a chirp compensation, becomes to be as 0.5 ps. Further, lengths of the HNLF and of the SMF for each stage of the CPF are determined by using the following formulas.

$$L_{HNLF}=3.3/\gamma P=1.17\Delta t_0^2/(4 \ln 2\beta_2),$$

$$L_{SMF}=1.29\Delta t_0^2/(4 \ln 2\beta_2) \quad \text{(Formula 2)}.$$

Here, the $\beta_2$ (ps$^2$/km) is the dispersion value of the fiber, and it has the following relation with the D (ps/nm/km).

$$\beta_2(\text{ps}^2/\text{km})=-10^{-5}(\lambda(\text{nm}))^2/2\pi c(10^{-8}(\text{m/s}))D(\text{ps/nm/km}) \quad \text{(Formula 3)}.$$

Still further, a nonlinear length LNL and a dispersion length LD in a real space are defined by $L_{NL}=1/\gamma P$, and $L_D=\Delta t_0^2/(4 \ln 2\beta_2)$, respectively. Furthermore, as assuming a nonlinearity γ of an HNLF to be as 11 (1/W/km), and as assuming a dispersion value of an SMF, a nonlinearity thereof and a propagation loss thereof to be as 16.3 ps/nm/km, 1.3 W$^{-1}$ km$^{-1}$ and 0.2 dB/km respectively, the dispersion value of the HNLF and the length thereof for each stage of the CPF, and the length of the SMF are determined as shown in Table 4.

TABLE 4

DESIGN OF IDEAL THREE-STAGES CPF

| | HNLF DISPERSION VALUE (ps/nm/km) | HNLF LENGTH (m) | SMF LENGTH (m) |
|---|---|---|---|
| FIRST STAGE | −23.9 | 86.5 | 139.7 |
| SECOND STAGE | −13.9 | 50.3 | 47.2 |
| THIRD STAGE | −8.09 | 29.2 | 16.0 |

Here, in such the case, the connection loss between the fibers to each others, and the propagation loss of the fibers are neglected. From this point of view regarding such the meaning, the design as shown in Table 4 is ideal. Thus, the characteristic of the pulse propagation becomes to be completely correspondent with the behavior of the ideal SRP as well, if such the CPF becomes to be manufactured thereby. And then it becomes able to realize the self-similar compression, which has the compression ratio as exactly R=1.72 for one stage thereof.

While, as taking into consideration of the parameters regarding the realistic fiber, the actual designing is performed as shown in Table 4, and then the CPF is manufactured based thereon. Here, the propagation losses regarding the HNLF and the SMF are assumed to be as 1.0 dB/km and 0.2 dB/km respectively, and the loss is assumed to be as 0.1 dB in the case of fusion splice for the HNLF and the SMF.

Such the above description is the detail of the method for designing the CPF.

Thus, the present invention is provided by being coupled with such the method for designing thereof.

INDUSTRIAL APPLICABILITY

As described above, it becomes able to enhance the compression efficiency as extremely high for each stage of the CPF regarding the optical pulse reshaping device according to the present invention, with maintaining the quality of the output pulse. Moreover, the waveform of the output pulse is the Gaussian type for both of the time waveform therefor and the frequency therefor, and then it becomes able to improve the degree of multiplexing therefor. Further, it becomes able to suppress the increase of the timing jitter in the case of compressing the pulse train, because it is able to maintain the cumulative dispersion value small for the whole of the CPF. Still further, by enhancing the compression efficiency thereof, it becomes able to serve many uses for the optical communication field, such as it becomes able to reduce the number of fusion splice of the fibers, it becomes able to reduce the propagation loss of the CPF, or the like.

Still further, it becomes able to expect that the optical pulse reshaping device, the optical pulse light source, the super-continuum light generator and the method for the super-continuum light generation are used for such as generating the seed light source for the SC light generation, generating the SC light thereof, or the like, and then that it provides a variety of the advantages thereby. Furthermore, by amplifying the light pulse to be as the high power therefor, which is obtained according to the present invention, it becomes able to obtain the higher applicability in the industries, such as obtaining the potential to be applicable for such as the ultrashort pulse processing machines, the medical equipments, or the like.

What is claimed is:

1. An optical pulse reshaping device comprising:
a nonlinear medium having a normal dispersion effect; and
an anomalous dispersion medium, with connecting to alternately therebetween,
wherein a dispersion value and an effective length of the nonlinear medium is determined for generating a nonlinear effect and a dispersion effect regarding the nonlinear medium with an approximately similar degree of magnitude therebetween.

2. The optical pulse reshaping device according to claim 1, wherein a specification of an input seed pulse, of the nonlinear medium and of the anomalous dispersion medium is specified individually, for an output pulse waveform from the optical pulse reshaping device to comply with a Gaussian function.

3. The optical pulse reshaping device according to claim 1, wherein the nonlinear medium is an optical fiber.

4. The optical pulse reshaping device according to claim 3, wherein the nonlinear medium is a highly nonlinear optical fiber.

5. The optical pulse reshaping device according to claim 1, wherein the anomalous dispersion medium is an optical fiber.

6. The optical pulse reshaping device according to claim 5, wherein the anomalous dispersion medium is a single mode optical fiber.

7. The optical pulse reshaping device according to claim 1, wherein the anomalous dispersion medium is a diffraction grating.

8. The optical pulse reshaping device according to claim 7, wherein the diffraction grating is a fiber bragg grating.

9. The optical pulse reshaping device according to claim 4, wherein the anomalous dispersion medium is a single mode optical fiber, a length of the highly nonlinear optical fiber is approximately similar to a dispersion length and is approximately as three times as a nonlinear length, and a length of the single mode optical fiber is approximately similar to the dispersion length.

10. The optical pulse reshaping device according to claim 4, wherein the anomalous dispersion medium is a single mode optical fiber, the length of the highly nonlinear optical fiber is as 1.17 times as the dispersion length and is as 3.3 times as the nonlinear length, and the length of the single mode optical fiber is as 1.29 times as the dispersion length.

11. An optical pulse light source comprising:
an optical pulse reshaping device comprising:
a nonlinear medium having a normal dispersion effect; and
an anomalous dispersion medium, with connecting to alternately therebetween,
wherein a dispersion value and an effective length of the nonlinear medium is determined for generating a nonlinear effect and a dispersion effect regarding the nonlinear medium with an approximately similar degree of magnitude therebetween.

12. The optical pulse light source according to claim 11, wherein a specification of an input seed pulse, of the nonlinear medium and of the anomalous dispersion medium is specified individually, for an output pulse waveform from the optical pulse reshaping device to comply with a Gaussian function.

13. The optical pulse light source according to claim 11, wherein the nonlinear medium is an optical fiber.

14. The optical pulse light source according to claim 13, wherein the nonlinear medium is a highly nonlinear optical fiber.

15. The optical pulse light source according to claim 11, wherein the anomalous dispersion medium is an optical fiber.

16. The optical pulse light source according to claim 15, wherein the anomalous dispersion medium is a single mode optical fiber.

17. The optical pulse light source according to claim 11, wherein the anomalous dispersion medium is a diffraction grating.

18. The optical pulse light source according to claim 17, wherein the diffraction grating is a fiber bragg grating.

19. A super-continuum light generator comprising the optical pulse light source of claim 11.

20. A method for a super-continuum light generation comprising the steps of:
inputting a pulse of Gaussian function into a normal dispersion HNLF, which is output from an optical pulse light source comprising an optical pulse reshaping device, which is configured using a nonlinear medium having a normal dispersion effect and an anomalous dispersion medium, with connecting to alternately therebetween, and determines a dispersion value and an effective length of the nonlinear medium for generating a nonlinear effect and a dispersion effect regarding the nonlinear medium with an approximately similar degree of magnitude therebetween; and generating a super-continuum light having a flat spectrum.

\* \* \* \* \*